(12) United States Patent
Haydock et al.

(10) Patent No.: US 6,376,957 B1
(45) Date of Patent: Apr. 23, 2002

(54) ALTERNATING CURRENT MACHINE

(75) Inventors: Lawrence Haydock, Peterborough;
Edward Spooner, County Durham,
both of (GB)

(73) Assignee: Newage International Ltd., Stamford (GB)

(*) Notice: Subject to any disclaimer, the term of this patent is extended or adjusted under 35 U.S.C. 154(b) by 0 days.

(21) Appl. No.: 09/551,356

(22) Filed: Apr. 18, 2000

(30) Foreign Application Priority Data

Apr. 16, 1999 (GB) ................................. 9908792
Mar. 30, 2000 (GB) ................................. 0007795

(51) Int. Cl.[7] .......................... H02K 21/00; H02K 1/17
(52) U.S. Cl. ............. 310/155; 310/154.02; 310/154.21; 310/154.43; 310/154.45; 310/168; 310/12; 318/701
(58) Field of Search .................. 310/154, 156, 310/168, 166, 254, 261, 155, 154.02, 154.21, 154.43, 154.45, 701, 181, 12

(56) References Cited

U.S. PATENT DOCUMENTS 4,933,585 A  6/1990  Rossi ........................ 310/162
5,532,531 A * 7/1996  Sakamoto ................. 310/49 R

FOREIGN PATENT DOCUMENTS

| DE | 196 43 791 A1 | 4/1998 | .......... H02K/21/38 |
| EP | 0 373 987 A | 6/1990 | .......... H02K/41/03 |
| EP | WO 98/36487 | 8/1998 | .......... H02K/21/26 |
| EP | 0 889 576 A1 | 1/1999 | .......... H02K/41/03 |
| FR | XP-000768387 | 9/1997 | |

* cited by examiner

*Primary Examiner*—Burton S. Mullins
(74) *Attorney, Agent, or Firm*—Gary M. Gron

(57) ABSTRACT

A generator or a 3-phase motor is arranged to provide multipolar permanent magnet excitation in combination with multipolar reluctance distribution wherein different numbers of poles are used for the permanent magnet excitation and for the reluctance distribution so that the principal working flux has a finite waveform. An annular rotor rotates about a cruciform stator. The magnets are buried in pole pieces of the stator so they converge radially inwardly with a triangular pole piece between them. Each pole piece is joined to the remainder of the stator by a bridge piece. The inner periphery of the rotor is formed as a circumferential array of teeth separated by recesses. The rotor may be within an annular stator or the machine may be linear.

132 Claims, 9 Drawing Sheets

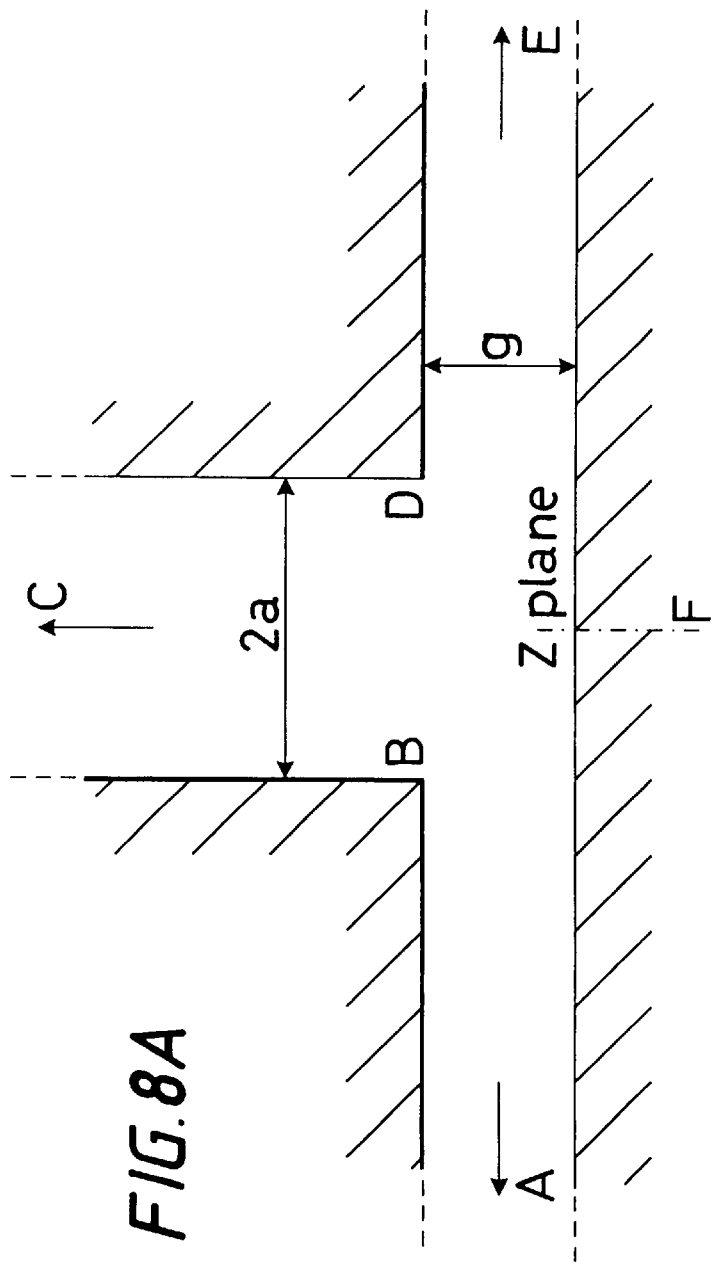
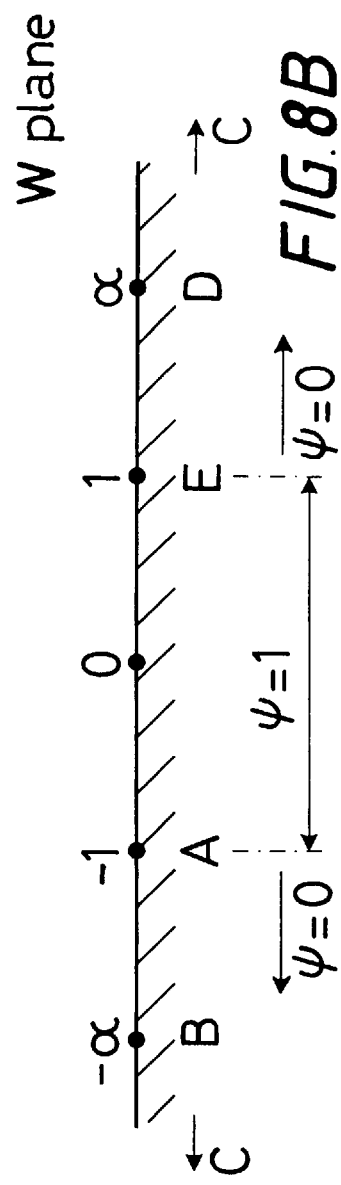
FIG.8A
FIG.8B

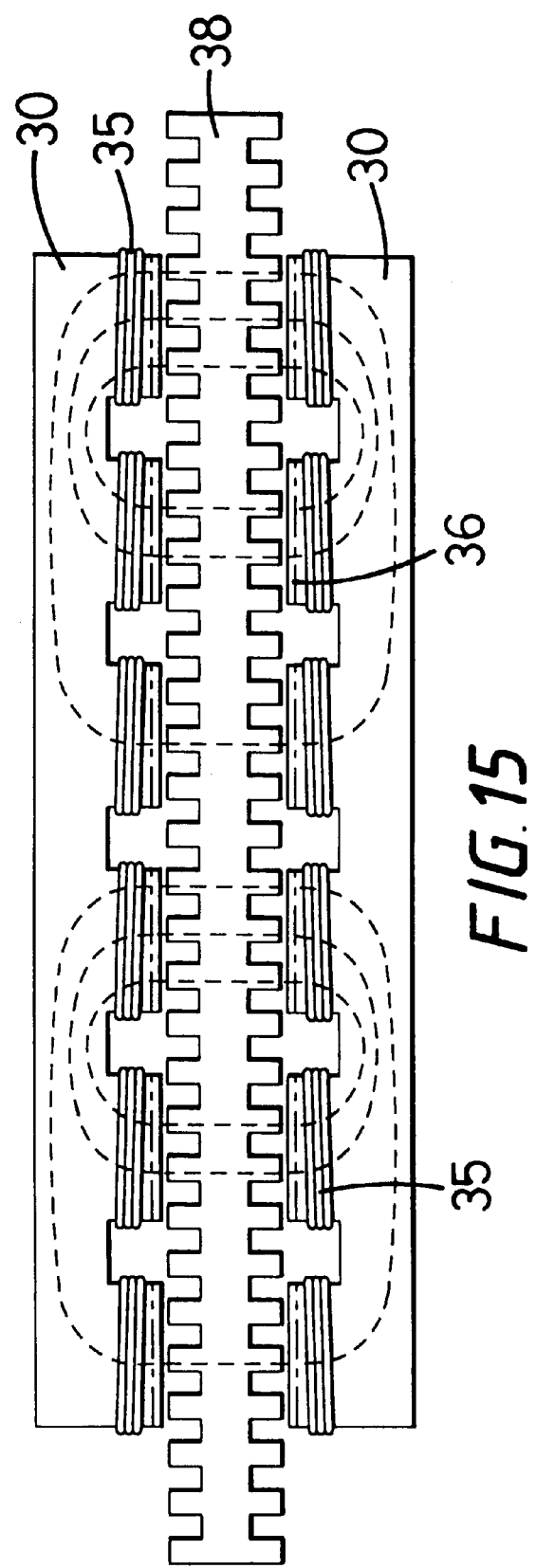

ALTERNATING CURRENT MACHINE

TECHNICAL FIELD

This invention relates to alternating current machines such as motors and generators.

BACKGROUND OF THE INVENTION

A paper entitled "New permanent magnet excited synchronous machine with high efficiency at low speeds" by Weh. H; Hoffmann. H and Landreth. J, Technische Universitat Braunschweig, Germany presented at the International Conference on Electrical Machines; Pisa 1988 describes a transverse flux arrangement which offered specific torque values much higher than the traditional radial flux configuration. The transverse flux machines disclosed are excited by permanent magnets which are mounted in alternating order upon the flux-guiding iron elements of the rotor. The magnets and the flux-guiding elements are arranged in a circumferential array around the periphery of the rotor, that circumferential array being arranged to rotate between pairs of axially spaced windings which are mounted in the stator. In order to reduce the influence of the stray flux, the rotor has to be made of non-magnetic material in the pole region except for the active parts of the magnetic circuit.

The transverse flux configuration combines a permanent magnet system with pole number 2p (i.e. wavenumber p) with an iron circuit which provides a special distribution of reluctance which also has a wavenumber p. The flux generated, being the product of magnetomotive force (mmf) and reluctance has a prominent zero wavenumber component which is employed as the working flux for energy transfer.

The disclosed transverse flux arrangement has two main drawbacks. Firstly, the flux component with wavenumber zero pulsates and so the generated torque also pulsates. This calls for at least two machine elements to be combined on the rotor shaft if a net constant torque is required, which is the case in most applications. Secondly, the construction of the permanent magnet and variable-reluctance elements of the machine is difficult since the flux follows paths which are inherently three-dimensional.

In a known form of alternating current machine which is known as a vernier reluctance machine, excitation is provided by a polyphase ac winding. Both the rotor and the stator have high wavenumber reluctance distributions, there being a difference in wavenumber equal to the wavenumber of the winding.

U.S. Pat. Nos. 5,386,161 and 5,532,531 respectively disclose three-phase permanent magnet stepper or brushless motors wherein the permanent magnets are part of the rotor. The brushless motor disclosed by U.S. Pat. No. 5,532,531 has a circumferential array of electromagnetic poles spaced by a uniform pitch and alternately magnetised. The permanent magnets on the rotor are also alternately magnetised and uniformly spaced with a pitch which is different from the pitch of the spacing of the stator poles.

DE-A-19643791 describes and illustrates a two phase servomotor based on an electronically commutated synchronous motor for relatively high output torque operation, comprising a rotor rotatable within a cylindrical stator with an annular air gap therebetween, the rotor having a circumferential array of teeth projecting towards the stator, and at least one pair of main poles per motor phase carrying working windings, the main pole pairs carrying permanent magnet excitation pole pairs which are mounted on the face of the respective main pole that faces the rotor and which have a pole pair pitch corresponding to the pitch of the rotor teeth, the excitation pole pairs being offset identically with the main poles from one motor phase to the other by $$\hat{o}_p H = m \times \hat{o}_z + \frac{\hat{o}_z}{2n} \text{ and } \hat{o}_p H = m \times \hat{o}_z + \frac{\hat{o}_z + n}{2n}$$

where
$\hat{O}_p H$ is the main pole pitch
$\hat{O}_z$=tooth pitch
$\hat{O}_p$=excitation pole pair pitch
n=phase number
m=integer EP-A-0373967 discloses an alternating current machine which includes two members of ferromagnetic material which form opposing boundaries of an air gap, one of which is movable relative to the other, one of the members having an armature winding arrangement and permanent magnets mounted on it, the magnets being arranged side by side in a line which follows the respective boundary of the air gap and being arranged to form a certain number of magnetic poles which are alternately north and south poles, the other member comprising a body portion and plurality of spaced projections which project from the body portion towards the one member in a direction which is transverse to the air gap, wherein each magnet is inserted into a respective groove which is formed in the surface of the one member that forms the respective boundary and which extends in a direction transverse to that boundary so that the surface of each magnet that faces the air gap is flush with the surface that forms that boundary.

One object of this invention is to provide novel configurations of alternating current machines which avoid the aforesaid main drawbacks of the disclosed transverse flux arrangement.

One subsidiary object of this invention is to avoid the need for electronic commutation.

Another subsidiary object of this invention is to provide an alternating current machine which offers high specific torque values.

SUMMARY OF THE INVENTION

According to one aspect of this invention there is provided an alternating current generator which is arranged to provide multipolar permanent magnet excitation in combination with multipolar reluctance distribution wherein different numbers of poles are used for the permanent magnet excitation on the one hand and for the reluctance distribution on the other hand so that the principal working flux has a finite waveform number which is equal to the difference in wavenumber between the mmf and permeance distributions.

According to another aspect of this invention, there is provided an alternating current motor which is arranged to provide multipolar permanent magnet excitation in combination with multipolar reluctance distribution wherein the motor has at least three phases whereby a traveling wave of mmf is produced substantially continuously and different numbers of poles are used for the permanent magnet excitation on the one hand and for the reluctance distribution on the other hand so that the principal working flux has a finite waveform number which is equal to the difference in wavenumber between the mmf and permeance distributions.

According to a further aspect of this invention there is provided an alternating current machine which is arranged to provide multipolar permanent magnet excitation in combination with multipolar reluctance distribution wherein different numbers of poles are used for the permanent magnet excitation on the one hand and for the reluctance distribution on the other hand so that the principal working flux has a finite waveform number which is equal to the difference in wavenumber between the mmf and permeance distributions, the machine including a cylindrical stator and a hollow cylindrical rotor which is mounted substantially coaxially with the cylindrical stator for rotation around the cylindrical stator with an annular air gap therebetween, the stator and the rotor being formed of ferromagnetic material, the stator having a winding arrangement and permanent magnets mounted on it, the magnets being arranged side by side in at least one circular line which follows the respective boundary of the air gap and being arranged to form a certain number of magnetic poles which are alternately north and south poles, the rotor being formed as a cylindrical body with a plurality of spaced projections which project radially from the body towards the stator, the number of projections being different from the magnetic waveform number that would be formed by a circular line of such alternately polarised magnets which were uniformly distributed along the whole of the respective boundary.

According to yet a further aspect of this invention there is provided an alternating current machine which is arranged to provide multipolar permanent magnet excitation in combination with multipolar reluctance distribution wherein different numbers of poles are used for the permanent magnet excitation on the one hand and for the reluctance distribution on the other hand so that the principal working flux has a finite waveform number which is equal to the difference in wavenumber between the mmf and permeance distributions, the machine including two members of ferromagnetic material which form opposing boundaries of an air gap and at least one of which is movable linearly relative to the other, one of the members having a winding arrangement and permanent magnets mounted on it, the magnets being arranged side by side in at least one line which follows the respective boundary of the air gap and being arranged to form a certain number of magnetic poles which are alternately north and south poles, the other member comprising a body portion and a plurality of spaced projections which project from the body portion towards said one member in a direction which is transverse to the air gap, the number of projections being different from the magnetic waveform number that would be formed by a line of such alternately polarised magnets which were uniformly distributed along the whole of the respective boundary.

Preferably the aforesaid alternating current generator or three phase motor includes two members of ferromagnetic material which form opposing boundaries of an air gap and at least one of which is movable relative to the other, one of the members having a winding arrangement and permanent magnets mounted on it, the magnets being arranged side by side in at least one line which follows the respective boundary of the air gap and being arranged to form a certain number of magnetic poles which are alternately north and south poles, the other member comprising a body portion and a plurality of spaced projection which project from the body portion towards said one member in a direction which is transverse to the air gap, the number of projections being different from the magnetic waveform number that would be formed by a line of such alternately polarised magnets which were uniformly distributed along the whole of the respective boundary.

The magnets may be mounted on the surface of said one member that faces said other member in which case the preferred ratio of thickness to width of each of the permanent magnets is substantially within the range of 0.2 to 0.4. Alternatively the magnets may be buried within said one member adjacent the air gap.

According to yet another aspect of this invention there is provided an alternating current machine which is arranged to provide multipolar permanent magnet excitation in combination with multipolar reluctance distribution and in which different numbers of poles are used for the permanent magnet excitation on the one hand and for the reluctance distribution on the other hand so that the principal working flux has a finite waveform number which is equal to the difference in wavenumber between the mmf and permeance distributions,the alternating current machine including two members of ferromagnetic material which form opposing boundaries of an air gap and at least one of which is movable relative to the other, one of the members having a winding arrangement and permanent magnets mounted on it, the magnets being arranged side by side in at least one line which follows the respective boundary of the air gap and being arranged to form a certain number of magnetic poles which are alternately north and south poles, the other member comprising a body portion and a plurality of spaced projections which project from the body portion towards said one member in a direction which is transverse to the air gap, the number of projections being different from the magnetic waveform number that would be formed by a line of such alternately polarised magnets which were uniformly distributed along the whole of the respective boundary, wherein the area of the surface of each magnet that affords the respective one of the magnetic poles is greater than the area that that magnet projects at the respective boundary of the air gap so that the flux density in the air gap associated with that magnet is greater than it would be if the surface of the magnet was flush with the respective boundary.

Preferably the surface of at least one of the magnets that affords the respective one of the magnetic poles is flat and oblique to the respective boundary.

Conveniently the magnets are flat and parallel sided. The magnets may be buried within said one member adjacent the air gap.

According to yet another aspect of this invention there is provided an alternating current machine which is arranged to provide multipolar permanent magnet excitation in combination with multipolar reluctance distribution wherein different numbers of poles are used for the permanent magnet excitation on the one hand and for the reluctance distribution on the other hand so that the principal working flux has a finite waveform number which is equal to the difference in wavenumber between the mmf and permeance distributions, the alternating current machine including two members of ferromagnetic material which form opposing boundaries of an air gap and at least one of which is movable relative to the other, one of the members having a winding arrangement and permanent magnets mounted on a surface of that one member which faces the other member, the magnets being arranged side by side in at least one line which follows the respective boundary of the air gap and being arranged to form a certain number of magnetic poles which are alternately north and south poles, the other member comprising a body portion and a plurality of spaced projections which project from the body portion towards said one member in a direction which is transverse to the air gap, the number of projections being different from the magnetic waveform number that would be formed by a line of such alternately polarised magnets which were uniformly distributed along the whole of the respective boundary, wherein the ratio of thickness to width of the permanent magnets is substantially within the range of 0.2 to 0.4.

The best choice for a compromise between the desire for high specific torque and high power factor is to use a ratio of thickness to width for each of the permanent magnets of about 0.2. On the other hand, where the desire for high specific torque is paramount, a ratio of thickness to width of each permanent magnet of 0.3 would be preferred.

In any aspect of this invention, the preferred number of projections which project from the body portion is half said certain number of magnetic poles plus or minus half the number of poles of the winding arrangement.

Each winding arrangement may comprise a respective projecting portion of said one member which projects towards said other member and on which a winding is wound. The magnets may be arranged in groups with a gap between each group which is mounted on a respective one of the projecting portions of said one member between the respective winding and said other member. Each of the number of projections may taper from the body towards the stator.

In an embodiment in which the magnets are buried within said one member, the magnets may be arranged in pairs, the magnets of each pair being of the same polarity, which is opposite to that of the juxtaposed pairs of magnets, and being arranged so that they converge radially inwardly, one on either side of a respective triangular pole piece, so that each triangular pole piece has the magnetic polarity of the convergent pair of magnets it is between. In this embodiment of the invention, each triangular pole piece is joined to the remainder of said one member by a respective bridge portion which passes between the nearer, radially inner ends of the magnets of the respective pair.

The lateral extent of each of the surface mounted magnets or the spacing between the outer ends of each pair of buried convergent magnets plus the thickness of the two magnets of that buried pair is preferably greater than the width of the outer end of each radial projection of said other member.

In an embodiment, the two members of ferromagnetic material may comprise a cylindrical stator and a cylindrical rotor, the cylindrical rotor being mounted substantially coaxially with the cylindrical stator for rotation relative thereto and with the air gap therebetween, the air gap being annular, the winding arrangement and the permanent magnets being mounted on the stator, the permanent magnets being spaced circumferentially one from another around the air gap, the rotor comprising a cylindrical body portion and said projections projecting radially from the cylindrical body portion towards the stator. Preferably the rotor has a laminated construction.

The stator may be a hollow cylinder with the rotor mounted for rotation within it. Alternatively, the rotor may be a hollow cylinder mounted for rotation around the stator.

In another embodiment, the two members may be arranged so that the movement of a first of them relative to the second is linear.

The one member may be stationary or it may be supported for linear movement relative to said other member.

Where relative movement between the two members is linear, the two members may be a first and a second of at least three such members, said second member separating said first member from a third member of ferromagnetic material, said second and third members forming opposing boundaries of another air gap and at least one of said second and third members being linearly movable relative to the other of said second and third members, said third member having a winding arrangement and permanent magnets mounted on it, these magnets being arranged side by side in at least one line which follows the boundary of the other air gap and being arranged to form a certain number of magnetic poles which are alternately north and south poles, there being a further plurality of spaced projections which project from the body portion of said second member towards said third member in a direction which is transverse to said other air gap, the number of these further projections being different from the magnetic waveform number that would be formed by a line of such alternately polarised magnets which are mounted on said third member and uniformly distributed along the whole of the boundary of said other air gap. Conveniently said first and third members are mirror images of one another as are the rows of projections formed on either side of said second member. The other or second member may be supported for linear movement relative to said one or said first and third members. In another arrangement, the winding arrangement and the polarities of the magnets on said third member may be the reverse of those on said first member so that the resultant paths of magnetic flux pass across said second member between said first and said third members.

An alternating current machine which embodies this invention may be a motor or it may be a generator. A thought process which a designer may pursue when designing a rotary machine which embodies this invention is described now by way of example with reference to FIG. 1 which illustrates interaction of mmf and permeance distribution in such a rotary machine to give distribution of working flux.

A notional stator having a circumferentially continuous periphery adjacent the rotor should be identified. It would have a number of alternately polarised magnets equi-spaced around that notional circumferentially continuous periphery which define a notional magnetic wavenumber (see FIG. 1). The rotor would be provided with a number of teeth which project towards the stator. That number of teeth would be any number which is different from the magnetic wave number. A number of permeance waveforms would be established equal in number to the number of teeth. There would be an interaction between the permeance waveforms and the notional magnetic waveforms which would create a number of flux waves which would be equal in number to the difference between the notional magnetic waveforms and the permeance waveforms.

The preferred form of armature winding arrangement comprises concentrated output coils. There may be one, two, three or more output phases and there would be at least one concentrated output coil for each phase. Alternatively the output arrangement may be in the form of a distributed winding.

In practice, in the case of a machine having two coils per phase, the stator also has to be provided with such a set of coils which are to interact with the flux waveforms and in which emf is to be induced. The stator would need to be provided with a number of cutouts, that number of cutouts being related to the number of coils. The choice of what material is to be removed from the notional stator is dependent upon the space that is required to accommodate the coils and other design criteria. The cutouts may be closed or semi-closed or open. If the cutouts are open or semi-closed, the periphery of the stator on which the magnets are mounted would be interrupted so that some of the magnets of the notional stator would not be fitted. There would be an even number of magnets on each of the remaining projecting portions of the stator between the cutouts in order to preserve magnetic balance. The design would be such that the flux distribution between the projecting portions of the stator remaining between the cutouts and on which the coils and magnets would be mounted would be the same as it would have been had the notional stator been used so that it is unaffected by the cutouts.

The overall vernier effect is not disturbed by the provision of open or semi-closed cutouts. However, in order to slightly increase the emf that is induced in the coils, it is beneficial to change the width of the stator projections and the spacing between the magnets thereon slightly so that the magnet spacing is such that the spacing of the north poles is the same as the tooth spacing. Hence that the magnetic wavelength is the same as the permeance wavelength locally as far as each stator projection is concerned although it is not so as far as the whole machine is concerned. This is because, at any one instant, only the magnets on one diametrically opposed pair of the projecting stator portions are aligned with the rotor teeth, the magnets on the other projecting stator portions being out of line with the teeth.

SUMMARY OF THE DRAWINGS

One form of rotary generator, two forms of rotary motor and three forms of linear machine in which this invention is embodied will be described now by example with reference to the accompanying drawings, of which:

FIG. 8A is part of FIG. 7 in an original 2D plane (z) and FIG. 8B illustrates stator surface of FIG. 7 in a transformed plane (w);

FIG. 15 is a diagrammatic illustration of another linear machine having two parallel air gaps.

DESCRIPTION OF THE PREFERRED EMBODIMENT

Figure 1:
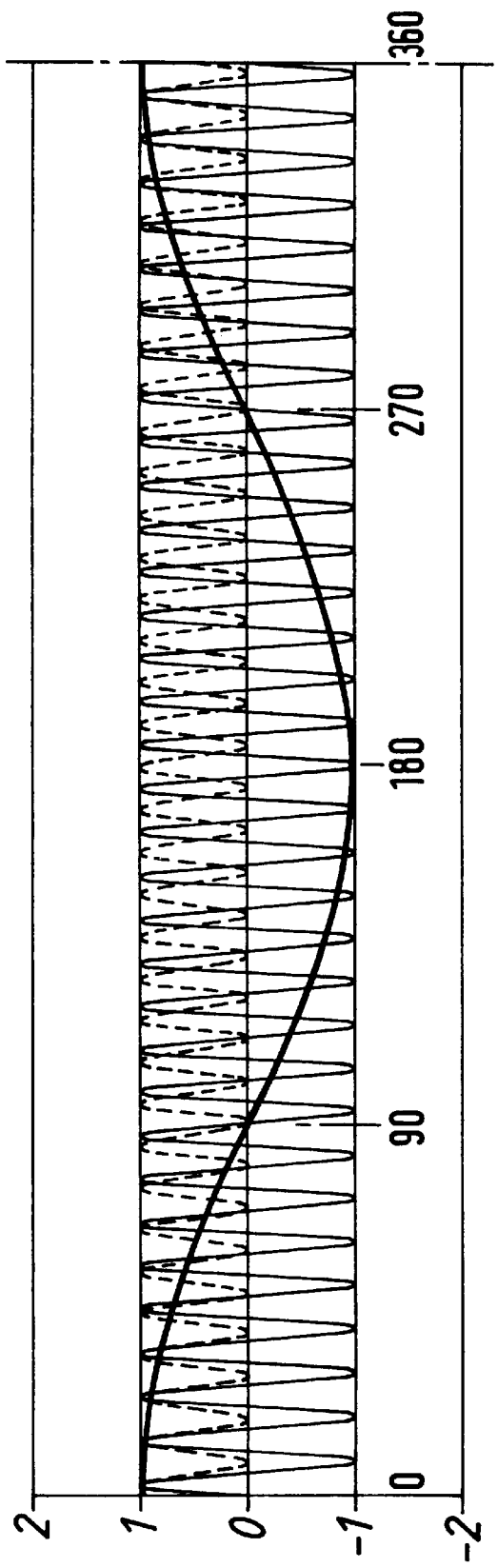
FIG. 1 is a graph of working flux.
Figure 2:
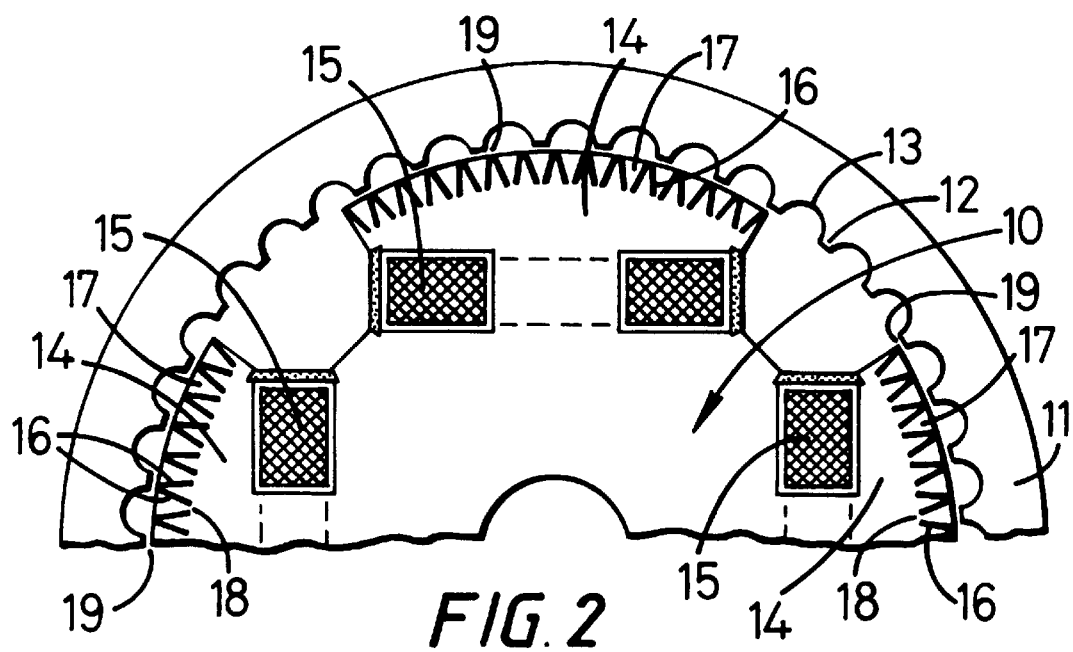
FIG. 2 is a diagrammatic fragmentary cross section of the exemplary rotary generator.

FIG. 2 shows about half a generator comprising a cylindrical stator 10 and a hollow cylindrical rotor 11 which is mounted coaxially around the stator 10 with an air gap therebetween and which is journalled for rotation around the stator 10. The stator 10 is symmetrical about its diameter which is close to the cut-away line shown in FIG. 2 so that the form of the whole stator 10 will be apparent. Likewise the part of the rotor 11 shown in FIG. 2 is typical of its whole. Each of the stator 10 and the rotor 11 has a laminated iron construction, low loss electrical steel being a suitable material.

The radially-inner periphery of the rotor 11 is formed as a circumferential array of forty-two radially inwardly directed projections or teeth 12. The teeth 12 are uniformly spaced from one another by scalloped portions 13 of the periphery of the rotor 11.

The stator 10 has a generally cruciform cross-section, comprising a generally square central portion with four similar, radially outwardly projecting pole pieces 14 which are each equi-spaced from the juxtaposed pole pieces 14. The pole pieces 14 are examples of the projecting portions of the stator that are spaced from one another by open cutouts as discussed above.

FIG. 2 shows there are approximately three or four scalloped portions 13 between each juxtaposed pair of pole pieces 14. Each pole piece 14 has a stator coil winding 15 wound on it adjacent the central portion. The stator coil windings are connected in series pairs and arranged to provide a two-phase output. This four coil layout closely resembles the field winding of a conventional alternator and it may be constructed by using a known form of winding machine designed for the construction of four-pole field windings.

Fourteen pairs of high strength rare earth permanent magnets 16 are buried in the material that forms the outer periphery of each pole piece 14 so that they are arranged in an array which is uniformly spaced along that periphery. The magnets 16 are formed of Neodymium—Iron—Boron (Nd—Fe—B) in sintered form. Each magnet 16 is flat and has parallel side faces and edges. The magnets 16 of each pair are of the same polarity which is opposite to the polarity of each juxtaposed pair of the magnets 16. Also the magnets 16 of each pair converge radially inwardly, one on either side of a respective triangular pole piece portion 17 so that each triangular pole piece portion 17 has the magnetic polarity of the convergent pair of magnets 16 it is between and serves as a magnetic pole. Hence each magnet 16 is oblique to the outer periphery of the respective pole piece 14. Also the area of the surface of each magnet 16 that affords the respective pole of that magnet 16 is greater than the area that that magnet projects at the outer periphery of the respective pole piece 14 so that the flux density in each triangular pole piece portion 17 and in the air gap 19 is greater than it would have been had the magnets 16 been mounted on the surface of the respective pole piece 14. Each triangular pole piece portion 17 is joined to the remainder of the stator 10 by a respective bridge portion 18 which passes between the nearer radially inner ends of the magnets 16 of the respective pair. The spacing between the radially outer ends of the magnets 16 of each convergent pair plus the thickness of those two magnets 16 is greater than the width of each of the teeth 12.

The number of magnetic poles is different from the number of permeance distribution points that are formed across the air gap 19 between a tooth 12 and a stator pole piece 14 with which it is aligned. As discussed above the number and spacing of the teeth 12 and of the pairs of magnets 16 on the pole pieces 14 are such that there is a vernier type interaction between them as the rotor 11 rotates around the stator.

Increasing the flux density in the air gap 19 increases the shear stress induced by relative rotation between the rotor 11 and the stator 10 which increases the specific torque of the machine.

Figure 3:
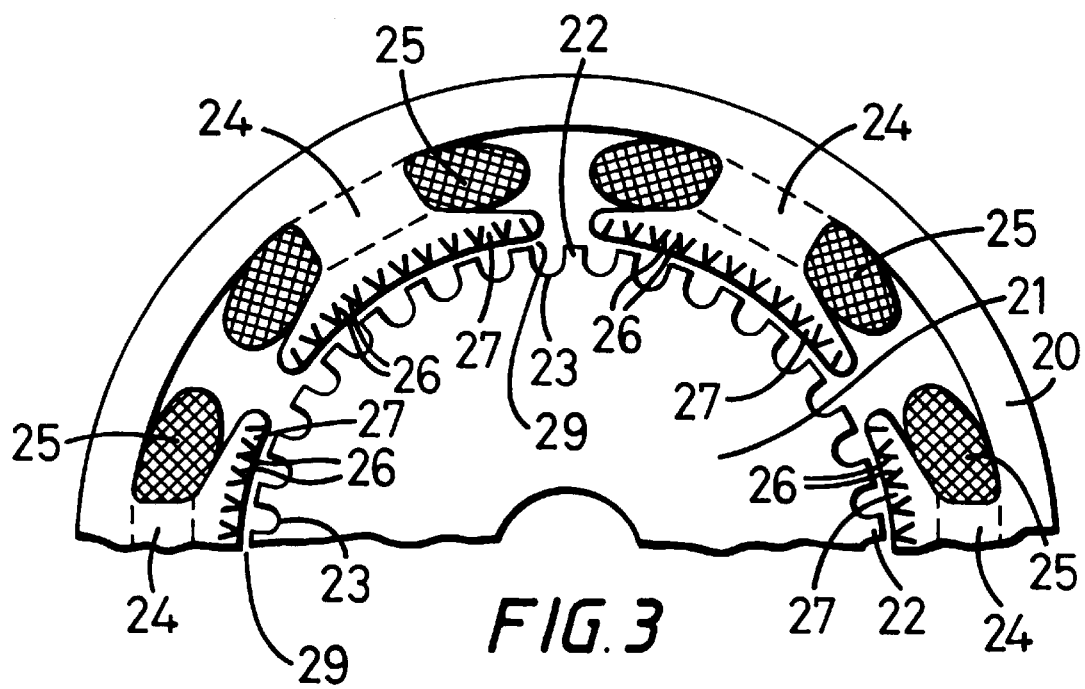
FIG. 3 is a diagrammatic fragmentary cross section of one of the exemplary rotary motors.

FIG. 3 shows a motor comprising a hollow cylindrical stator 20 and a cylindrical rotor 21 which is mounted substantially coaxially within the stator 20 with an air gap 29 therebetween and which is journalled for rotation relative to the stator 20. Each of the stator 20 and the rotor 21 has a laminated iron construction.

The radially outer periphery of the rotor 21 is formed of thirty four radially outwardly directed projections or teeth 22. The teeth are uniformly spaced from one another by scalloped portions 23 of the periphery of the rotor 21.

The cylindrical stator 20 comprises an annular outer portion with six similar, radially inwardly projecting pole pieces 24 which are each equi-spaced from the juxtaposed pole pieces 24. Again, the pole pieces 24 are examples of the projecting portions discussed above and they are spaced from one another by semi-closed cutouts. About one scalloped portion 23 is shown between each juxtaposed pair of pole pieces 24. Each pole piece 24 has a stator coil winding 25 wound on it adjacent the annular outer portion of the stator 20. These six stator windings 25 form a two-pole, three-phase ac winding.

In operation of the motor, three phase current in the stator windings 25 produces a continuously rotating wave of mmf in the hollow interior of the stator 20 which rotates continuously around the air gap at a synchronus speed.

Ten pairs of high strength rare earth magnets 26 are buried in the material that forms the inner periphery of each pole piece 24 in a manner similar to the pairs of magnets 16 that are buried in the pole pieces 14 of the generator described above and shown in FIG. 2. The pairs of magnets 26 are mounted so that they have alternate polarity. The mean pole pitch of the pairs of magnets 26 corresponds to a wavenumber of thirty three. The spacing between the radially outer ends of the magnets 26 of each convergent pair of magnets 26 plus the thickness of those two magnets 26 is greater than the width of each of the teeth 22.

FIG. 3 shows that the triangular magnetic poles formed by the triangular pole piece portions 27 between the magnets 26 of each pair on the two diametrically opposed pole pieces 24 that are midway between the top and the bottom of the stator 20 as seen in FIG. 3 are substantially in line with the teeth 22 of the rotor 21 whereas the airs of magnets 26 on the other four pole pieces 24 are not so aligned with teeth of the rotor 21. This illustrates how the vernier effect is achieved even when the magnet spacing of the north poles on each pole piece 24 is the same as the spacing of the teeth 22 on the rotor 21. It will be understood that this is a transient condition which will be repeated for each of the other pole pieces 24 as the rotor 21 rotates.

The resulting flux has a principal component with a wavenumber equal to the difference between the mmf and reluctance distributions, namely thirty four to thirty three, which means it is a two-pole wave. The two-pole wave has a rotational speed thirty four times the rotor speed and induces emf in the two-pole three-phase stator winding with a frequency thirty four times the rotational frequency of the rotor. Although the flux amplitude is quite small, its rate of change in the winding is very high for a given rotor speed so that large emfs can be induced with few turns.

The resultant rotating field enables the three phase motor to be operated without electrical commutation. That would be so were the motor to have more than three phases.

Figure 4:
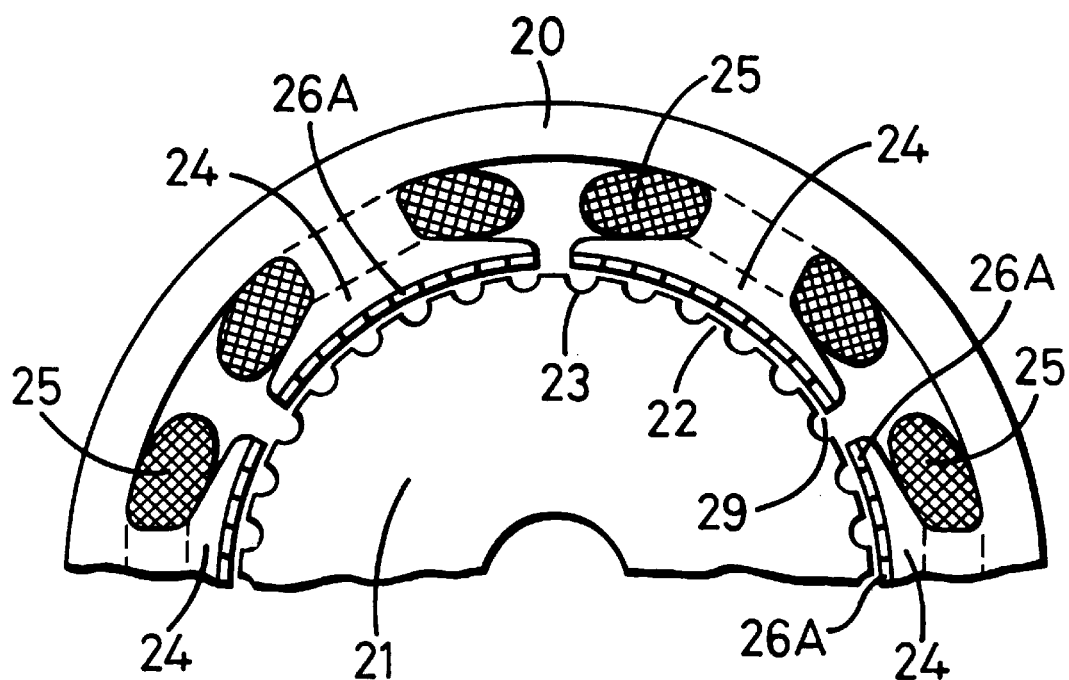
FIG. 4 is a diagrammatic fragmentary cross section of the other exemplary rotary motor.

FIG. 4 shows a motor which differs from the motor described above with reference to and as shown in FIG. 3 only by the arrangement of the permanent magnets that are mounted on the six pole pieces 24. The rotor 21 is the same as the rotor 21 of the motor shown in FIG. 3. Also the structure of the stator 20 with its six pole pieces 24 is basically the same as that of the stator 20 of the motor shown in FIG. 3. Instead of there being ten pairs of magnets 26 that are buried in each of the pole pieces 24, as has been described above with reference to FIG. 3, ten high strength rare earth magnets 26A are mounted on the radially inner surface of each pole piece 24. The magnets 26A are mounted so that they extend circumferentially end-to-end and have alternate polarity. The mean pole pitch of the magnets 26A corresponds to a wavenumber of thirty three. The circumferential extent of each of the magnets 26A is greater than the width of each of the teeth 22.

FIG. 4 shows that the magnets 26A on the two diametrically opposed pole pieces 24 that are midway between the top and the bottom of the stator 20 as seen in FIG. 4 are substantially in line with the teeth of the rotor 21 whereas the magnets 26A on the other four pole pieces 24 are not so aligned with the teeth of the rotor 21. Again this illustrates how the vernier effect is achieved even when the spacing of the north poles of the magnets 26A on each pole piece 24 is the same as the spacing of the teeth 22 on the rotor 21.

As was the case for the motor described above with reference to FIG. 3, the resulting flux has a principal component with a wavenumber equal to the difference between the mmf and reluctance distributions, namely thirty four to thirty three, so that it is a two-pole three-phase wave which has a rotational speed thirty four times the rotor speed and induces emf in the two-pole three-phase stator winding with a frequency thirty four times the rotational frequency of the rotor.

The flux density in the air gap 29 due to the magnets 26A is less than that due to the buried magnets 26 with a consequence that the specific torque and power factor of the motor shown in FIG. 4 are less than for the motor shown in FIG. 3. On the other hand, the surface mounted magnets 26A are more easily replaced.

The set of permanent magnets 26A creates mmf across the airgap 29.

Since the magnets 26A are carried on the stator 20 then the mmf distribution is stationary and described by $$F = \hat{F} \sin(p_1 \grave{e}) \text{ (Amp)} \quad (1)$$

The teeth 22 and intervening slots 23 on the rotor 21 modulate the airgap permeance between upper and lower bounds. It is relative movement between the permeance and mmf distributions which gives rise to the desired flux variation. Were the roles of rotor and stator, that is to say if the magnets were carried by the rotor and the teeth and slots were formed on the stator, the principle of operation would not be altered. As the rotor 21 turns the permeance pattern rotates with it. Permeance is defined in this context as proportional to the inverse of the effective airgap, assuming that the flux is purely radial $$P = \hat{P}_0 + P \sin(p_2 \grave{e} - \grave{u}t) \text{ } (m^{-1}) \quad (2)$$

The airgap flux is $$B = \grave{\imath}_0 F / g = FP \quad (3)$$

$$B = FP_o \sin(p_1 \grave{e}) + \frac{\hat{F}\hat{P}}{2}\cos\{(p_1 - p_2)\grave{e} + \grave{u}t\} - \frac{\hat{F}\hat{P}}{2}\sin\{(p_1 + p_2)\grave{e} - \grave{u}t\}$$

The second term of equation (3) describes an alternating long-wavelength flux component; this is the principal working flux of the machine. The stator winding 25 links this component and produces emf. The third term describes a short wavelength component, this is much more difficult to exploit and is regarded as a ripple flux and constitutes a nuisance.

The wave numbers $p_1$ and $p_2$ are quite large and slightly different leading to a pronounced gearing effect.

It is usual to discriminate between electrical machines developing torque through the Lorentz force (Bil) and those developing torque by means of reluctance variation (dL/dè). An electrical machine in which this invention is embodied clearly falls within the second category, but an inspection of torque production by the means of the Lorentz force is possible for such a machine and is quite illuminating.

Figure 5:
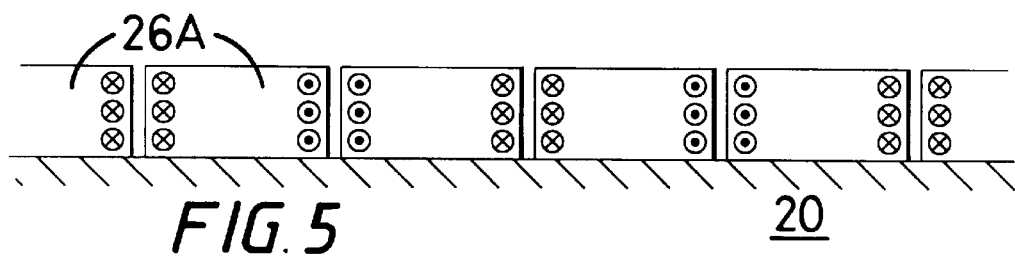
FIG. 5 is a diagrammatic representation of part of a row of permanent magnets on a stator of an alternating current machine in which this invention is embodied.

Permanent magnets with linear demagnetisation characteristics in the second quadrant of the BH chart are conveniently modelled by an mmf source with a series reluctance (the so-called magnetic battery model). The value of the series reluctance is very close to that of the space occupied by the magnet. The mmf is very close to the value given by the product of coercivity and the thickness, h, of the magnet. If the recoil permeability were 1, then the correspondence would be exact; modern rare earth magnets have recoil permeability of 1.05 to 1.1. So it is a good approximation to represent a rare-earth magnet simply as a region of space enclosed by a current sheet with linear current density equal to the coercivity. An array of magnets mounted on an iron surface can therefore be represented by a set of currents as shown in FIG. 5, and the electric loading or linear current density is of the order $$K=H_c h/w \quad (4)$$

This value can be applied to determine torque in just the same way as is done for the armature of a machine using the Lorentz force.

The force developed in the tangential direction on a single conductor, of length 1, carrying current i, and in the presence of an externally-applied radial flux density B is $$F=Bli \quad (5)$$

If an array of such conductors is installed with pitch w, they produce together a linear current density or electric loading of $$K=i/w \quad (6)$$

and the forces acting on the conductors tend to shear the magnets from the iron surface and create a shear stress of $$ó=BK \quad (7)$$

If the array of conductors forms a cylinder then the total force is the product of the shear stress and the surface area of the cylinder and the torque is the product of the force and the radius $$T=BK.2\pi l..r \text{ ie. } TBK.\text{volume} \quad (8)$$

and we see that the specific torque (Torque per until volume) is simply the shear stress at the airgap 29.

The specific torque is limited by the practical limits placed separately on B and K by material properties such as saturation and design considerations relating to the temperature rise of the conductors.

The equivalent electric loading of an array of magnets is not restricted nearly so tightly as that of an electrical winding. For example, a large motor with slots 50 mm deep or more and with intensive forced ventilation might achieve an electric loading of 80 to 980 kA/m. An array of rare-earth magnets, with $H_c$=900 kA/m, 5 mm thick and 15 mm wide gives the equivalent K=300 kA/m (and without power loss).

The following analysis necessarily ignores a number of features such as the possibility of the slot width being different from the tooth width and assumes that the slots are of infinite depth. Finite element analysis can include such details and provides far richer detail of the field distribution. However, at the present stage where we seek an optimum in a space of several parameters, analysis of a simplified model is more helpful.

Figure 6:
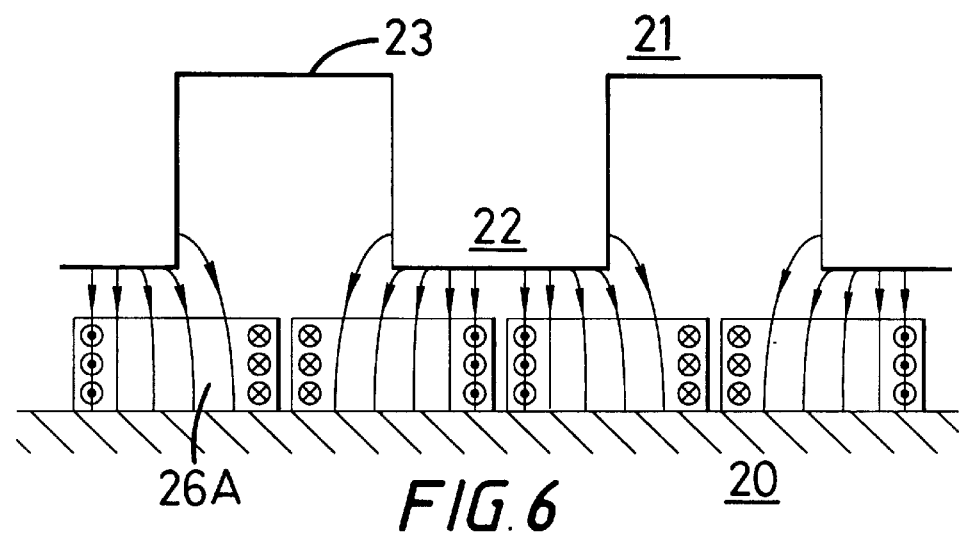
FIG. 6 is a view similar to FIG. 5 showing rotor teeth and flux distribution.

Of course the force generated at one side of a magnet will cancel that generated at the other side unless the flux density is different. Ideally the externally-applied flux density at the two sides of the magnet would be of opposite polarity and as high as saturation permits. Slots and teeth partly achieve the ideal reversal of flux density across the width of the magnet as can be seen from FIG. 6.

The maximum force generated by each magnet 26A is achieved when the left and right edges of the magnet 26A are coincident with the centre lines of the slot 23 and tooth 22, in which case $$F=(B_{tooth}-B_{slot})1H_c h \quad (9)$$

and the mean shear stress taken over the full magnet area is $$ó=(B_{tooth}-B_{slot})H_c h/w_m \quad (10)$$

$$ó=H_c B_{tooth} x(1-B_{slot}/B_{tooth})hw_m \quad (11)$$

The flux density $B_{tooth}$ between a tooth 22 and the stator surface is restricted by saturation of the magnetic circuit (principally in the tooth root region) and would be around 1.5 to 2.0T provided that adequate excitation is available.

The value of $B_{tooth}/B_{slot}$ (where $B_{slot}$ is the flux density between a slot 23 and the stator surface) is a function of the following dimensionless geometrical ratios:

1. Slot width/slot pitch 2a/ô
2. Slot depth/slot pitch $d_s$/ô
3. Total airgap/slot pitch g/ô

Figure 7:
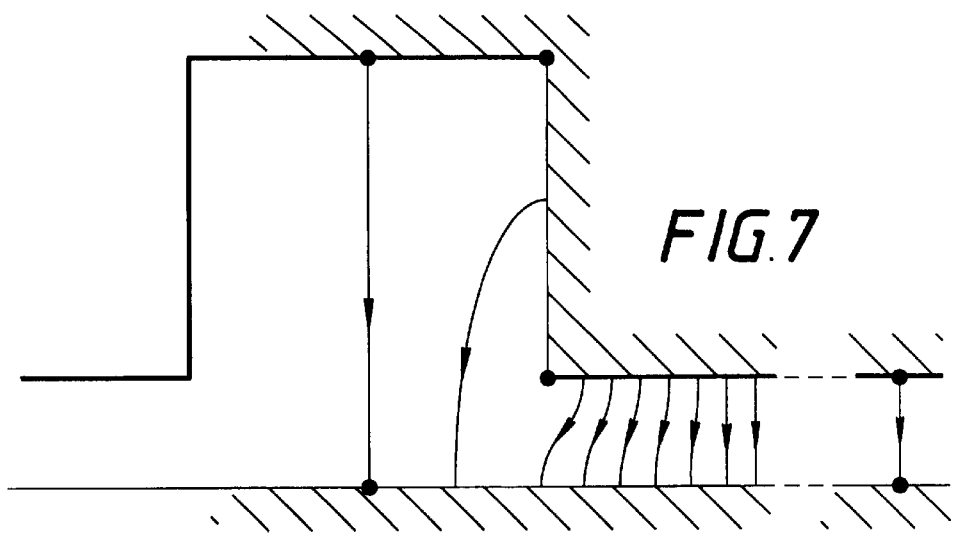
FIG. 7 is part of FIG. 6 showing a single slot between teeth with the magnets omitted.

The slotted airgap region is described for analytical purposes by the region shown in FIG. 7 which is a six-sided polygon, two sides of which are flux-line boundaries and four are infinitely-permeable boundaries. This model would underestimate the ratio $B_{slot}/B_{tooth}$ because the finite width of the tooth 22 is ignored. The error is expected to be quite small except where extreme values of the ratio of total gap to tooth width are involved and such cases are not of great practical importance. Nevertheless it should be noted that the analysis will give a slightly optimistic indication of the shear stress generated.

This model is not amenable to straightforward analysis, however, a useful approximate solution is obtained relatively easily from the simplified model shown in FIG. 8A using conformal transformation. This causes a further slight underestimation of the ratio $B_{slot}/B_{tooth}$ because now the finite depth of the slot is ignored also. The value of $B_{slot}/B_{tooth}$ in the new model is just a function of the ratio total airgap/slot width. The boundaries of the simplified model plotted on the complex plane z=x+jy map to the real axis of the complex plane w=u+jv and the region of the slot and airgap maps to the upper half (positive imaginary) of the w plane, are as illustrated in FIG. 8B. The transformation is given by the Schwarz-Christoffel equation $$\frac{dz}{dw} = S \frac{\sqrt{w^2 - á^2}}{w^2 - 1} \quad (12)$$

where $$á^2 = 1 + \frac{g^2}{á^2}$$

and S is a scale factor

Point F in the z plane is mapped to the origin of the w plane. Points A and E at the infinite extensions of the real axis of the z plane map are mapped to points at −1 and +1 on the real axis of the w plane. Point C at the infinite extreme of the imaginary axis of the z plane map and are mapped to the two extremes of the real axis of the w plane. Points B and D represent the tooth corners in the z plane map and are mapped to points at −á and +á on the real axis of the w plane. All the boundaries are modelled as infinitely permeable.

The rotor tooth regions are held at elevated potential relative to the smooth stator surface. In the w plane this is represented by setting the potential, Ø to zero except between −1 and +1 where it is equal to the applied potential between slotted rotor and smooth stator in the z plane, arbitrarily taken to be 1. This corresponds to current +1A normal to the w plane at u=−1 and −1A at u=+1. The resulting vector potential field in the w plane is given by $$Á = \frac{1}{2\eth} \ln(w-1) - \frac{1}{2\eth} \ln(w+1) \quad (13)$$

and the flux density is $$B = \frac{dÁ}{Dz} = \frac{dÁ}{dw}\frac{dw}{dz} = \frac{1}{\eth(w^2-1)} \frac{1}{S} \frac{(w^2-1)}{\sqrt{w^2-á^2}} = \frac{1}{S\eth\sqrt{w^2-á^2}} \quad (14)$$

The ratio between stator flux density at the slot centre line and under the tooth 22 is therefore $$\frac{B_{slot}}{B_{tooth}} = \frac{\sqrt{á^2-1}}{á} = \frac{g}{\sqrt{g^2+á^2}} \quad (15)$$

Substituting in (11)

$$ó = H_c B_{tooth} X \left[1 - \left\{\frac{g}{\sqrt{g^2+á^2}}\right\}\right] \frac{h}{w_m} \quad (16)$$

Operation is limited by saturation of the magnetic circuit. The circuit zone is at the roots of the rotor teeth 22. Most of the flux crossing the gap 29 reaches the rotor back iron via the tooth root. A good approximation to the limiting value of $B_{tooth}$ is $$B_{tooth} \approx \frac{B_{tooth}}{B_{tooth} + B_{slot}} \times B_{root} \quad (17)$$

From (15)

$$= \frac{B_{root}}{1 + g/\sqrt{g^2+á^2}} \quad (18)$$

Substituting in (16)

$$óH_c B_{root} \frac{h}{w_m} \frac{\sqrt{g^2+á^2}-g}{\sqrt{g^2+á^2}+g} \quad (19)$$

The slot 23 and tooth 22 should be of similar width corresponding approximately to the width of the magnets 26A. Also, the maximum thickness of magnet 26A that can be accommodated is g and so the maximum stress which can possibly be developed on the basis of the given geometry is given closely by $$ó = H_c B_{root} k \frac{\sqrt{4k^2+1}-2k}{\sqrt{4k^2+1}+2k} \quad (20)$$

where k is the ratio of magnet thickness to width.

Figure 9:
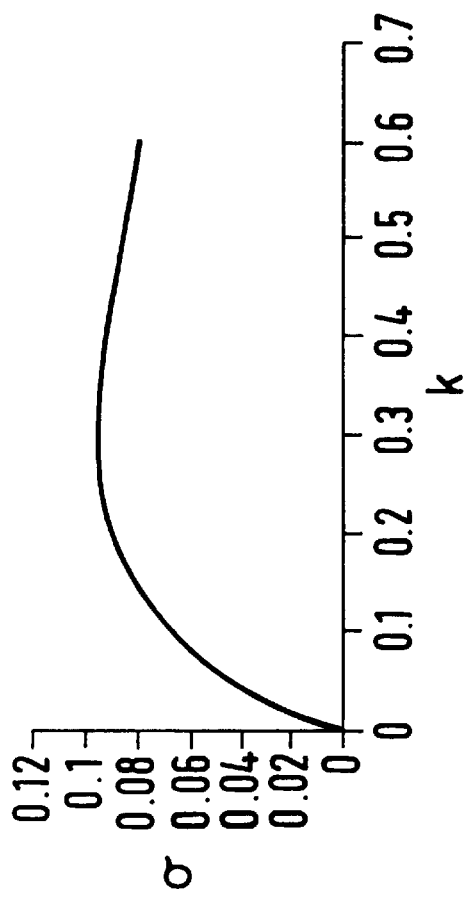
FIG. 9 is a graph of shear stress in the air gap against k, the ratio of magnet thickness to width.

FIG. 9 shows the maximum value of the stress is approximately $0.095 H_c B_{root}$ and is obtained for k=0.3. The curve of ü vs k indicates that a broad maximum exists with ü>$0.9 H_c B_{root}$. For 0.2<k<−0.4. The flux density at the tooth root is limited by saturation to about 2T and the coercivity of the Nd—Fe—B magnets is about 900 kA/m so that the maximum stress available is approximately 170 kN/m².

It would be possible to increase the shear stress further by using tapered teeth so that the width is greater at the root allowing more flux to be delivered to the airgap before the onset of saturation. However this adversely affects the power factor.

The power factor is poor which is a cause for concern.

For motor applications the poor power factor calls for power supply ratings several times greater than the nominal power to be delivered. In generator applications, the poor power factor is reflected in the appearance of a high reactance in series with the fixed emf generated by the permanent magnet excitation. The resulting voltage regulation becomes unacceptable at loads much less than the machine could otherwise deliver, and some form of additional excitation is required via the stator windings supplied either by capacitors or electronically.

Design choices are needed to ameliorate the effect of the poor power factor.

We again consider the instantaneous situation where the boundaries between adjacent magnets 26A lie on the centre lines of teeth 22 and slots 23. There is no net flux due to the magnets 26A and so the coil 25 has zero flux linkage from the magnets 26A and the emf is at its peak. Coil current is maximum at this instant and so in the electrical equivalent circuit, the current is in phase with the emf. The terminal voltage is the sum of the open circuit emf created by magnet flux and the voltage associated with the synchronous reactance.

If the electrical frequency is ü, the relative velocity of the rotor 21 past the stator 20 is $$V = 2 w_m \dot{u}/2\eth \quad (21)$$

and the power developed over each square metre of rotor surface interacting with adjacent stator surface is obtained from the shear stress. However, the shear stress derived above is a maximum value pertaining to the instant when the edges of the magnets 26A are coincident with the centre lines of the teeth 22 and slots 23. The mean shear stress taken over a complete cycle is half this value if the coil current is synchronised with the magnet movement.

$$\bar{P} = V\hat{o}/2 \qquad (22)$$

Figure 10:
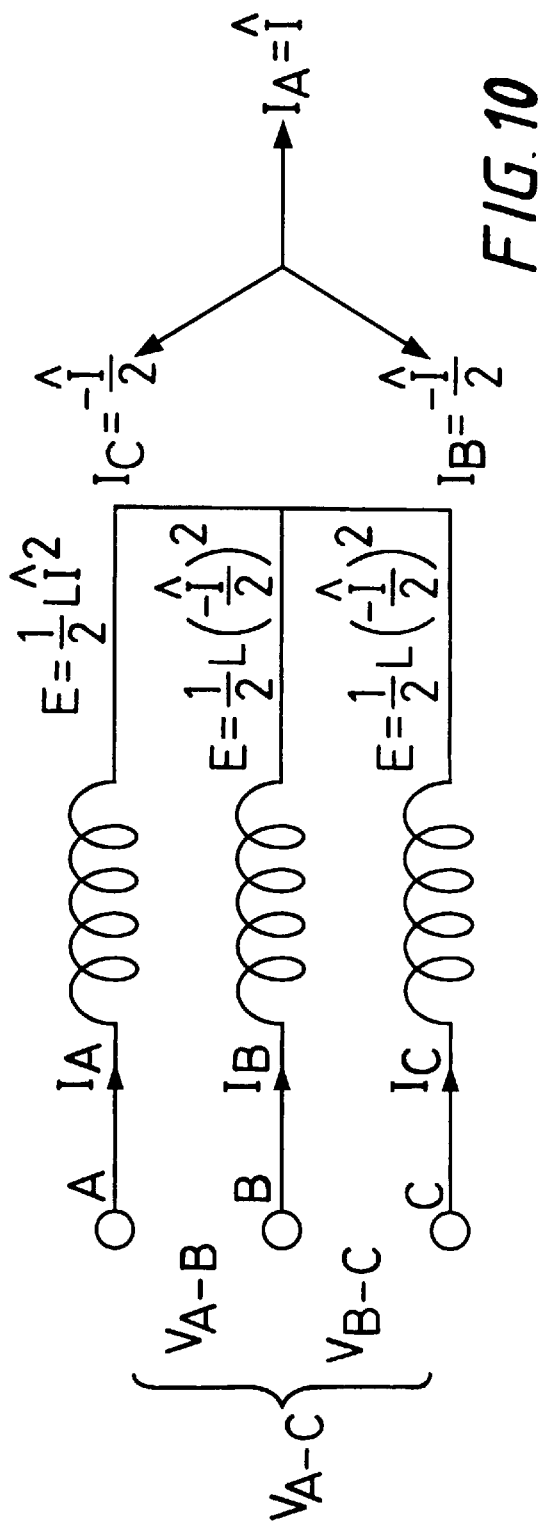
FIG. 10 is an electrical circuit diagram of a three phase inductive load with a balanced supply.

Repeated reversal of the magnetic field in the airgap 29 requires energy to be delivered from the supply, stored in the airgap field and returned to the supply. This process is manifest as reactive power drawn from the supply by the stator windings 25, the magnitude of the reactive power is related to the quantity of energy involved and the rate of delivery and return (ie frequency). Consider, for example, a three-phase inductive load connected to a balanced supply (see FIG. 10). The reactive power drawn is $$Q = 3(\bar{I}/\sqrt{2})^2 \dot{u} L \qquad (23)$$

and the energy stored magnetically within the load is $$E + \frac{3}{2}\frac{LI^2}{2} \qquad (24)$$

From which it is apparent that $$Q = 2\dot{u}\mathring{A} \qquad (25)$$

This result is independent of the number of phases, coils, turns etc.

In one form of electrical machine which embodies this invention which has 1 square meter of interacting surface, the magnetic stored energy has a maximum value of approximately $$\mathring{A}_{max} \cong g \frac{1}{2\mu_0} \frac{B_{tooth}^2 + B_{slot}^2}{2} \qquad (26)$$

Of course as the current in the stator coils alternates, the magnetic field in the adjacent region of the airgap alternates likewise and the energy pulsates. If a balanced polyphase winding is used then the total energy stored within the machine, per square meter of interacting surface, is half the above value and the corresponding reactive power drawn from the supply is $$Q = \dot{u}\mathring{A}_{max} = \dot{u}g\frac{1}{2\mu_0}\frac{B_{tooth}^2 + B_{slot}^2}{2} \qquad (27)$$

Combining equations 11, 21 and 22 and taking the most favourable situation of h=g where the magnet completely fills the gap $$P = \frac{\omega}{2\pi} H_c B_{tooth} g \frac{1 - B_{slot}}{B_{tooth}} \qquad (28)$$

The ratio of reactive to real power is found from equations 15, 17 27 and 28

$$\frac{Q}{P} = \frac{\pi B_{root}}{2\mu_0 H_c}(1 + 8K^2) \qquad (29)$$

Where again k is the ratio of magnet thickness to width.

The power factor is $$pf = \frac{1}{\sqrt{\left\{1 + \frac{\pi B_{root}}{2\mu_0 H_c}\right\}^2 (1 + 8k^2)^2}} \qquad (30)$$

Figure 11:
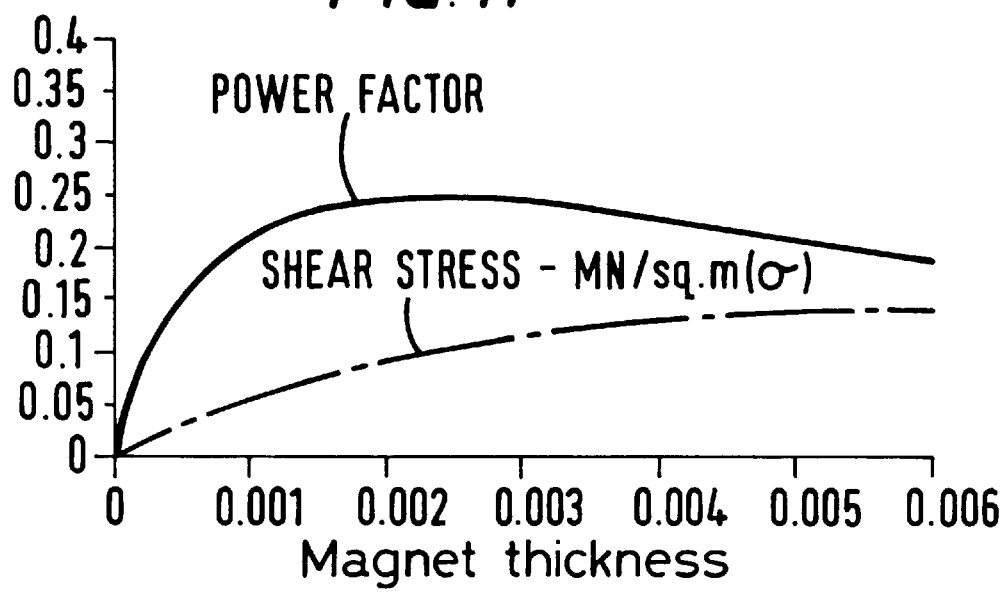
FIGS. 11 and 12 are graphs of shear stress and power factor against magnet thickness for different flux densities at the roots of the teeth.
Figure 12:
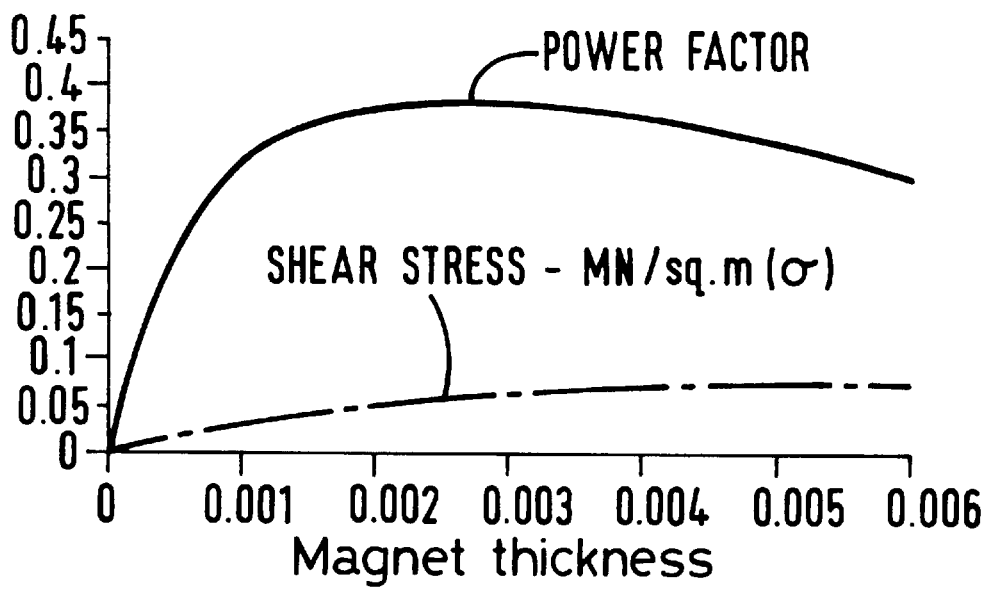

Taking $B_{root}$ to be 1.8T and $H_c$ to be 900 ka/m, the maximum possible power factor is 0.37. However, this value applies for k=0 which corresponds to zero shear stress and zero power. A more practical situation is depicted in FIG. 11 which plots power factor and shear stress as functions of k and which also makes allowance for a 1 mm mechanical clearance between rotor and stator. FIG. 12 is similar but for $B_{root}$=1.0T. The choice of flux density is a compromise between the desire for high specific torque and high power factor. It can be seen that the best choice of magnet proportions is to use a thickness about ⅕ of the width irrespective of the flux density.

By using different wave numbers for the mmf and permeance distributions in motors or generators in which this invention is embodied, the main flux used for inducing the armature emf has a low but finite wavenumber. The flux paths are thus two dimensional so that conventional laminations can be used and a polyphase winding can be used so that the machine produces smooth torque within a single machine element.

The stator of a motor or a generator in which this invention is embodied has a polyphase armature winding with pole number $2P_a$ and a set of magnets arranged to form an mmf distribution with pole number $2P_m$. There are either $(P_a+P_m)$ or $(P_a-P_m)$ teeth on the rotor. The actual number of teeth provided will be selected having regard to the designed rotor speed, the greater the rotor speed the fewer the number of teeth that would be required. However there should be at least two.

Figure 13:
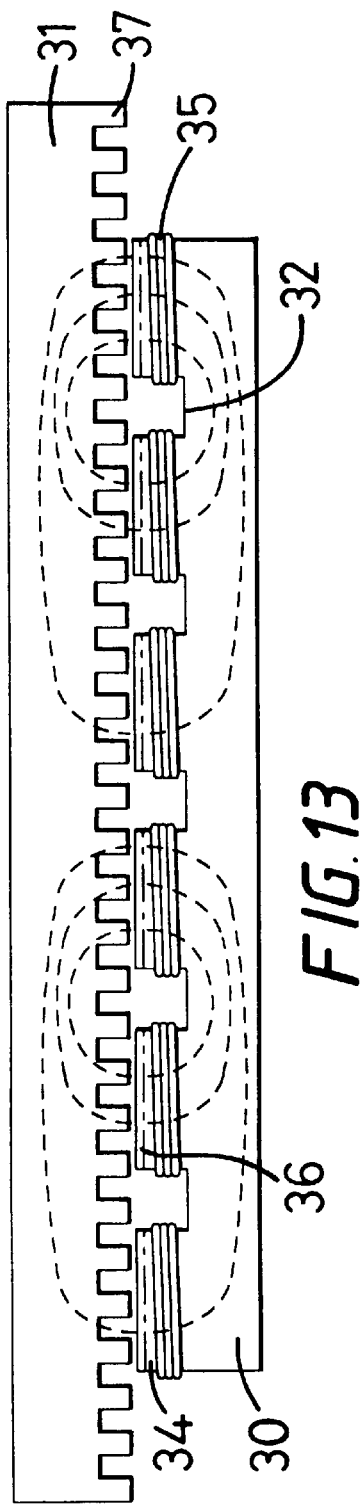
FIG. 13 is a diagrammatic illustration of a linear machine having one air gap.
Figure 14:
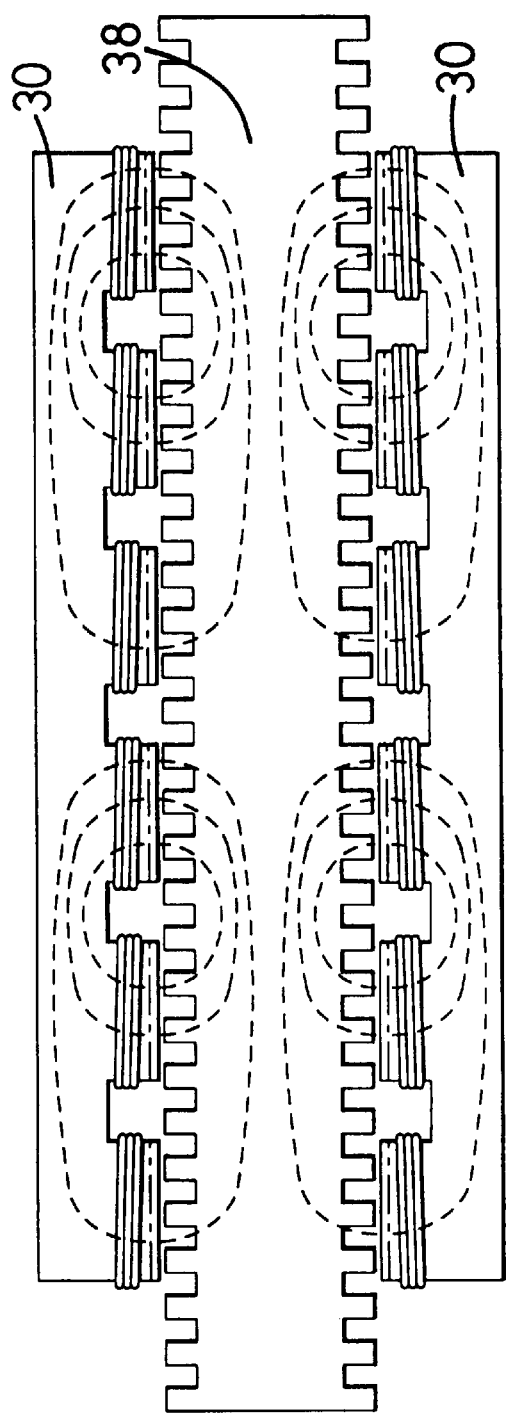
FIG. 14 is a diagrammatic illustration of a linear machine having two parallel air gaps.

Machines in which this invention is embodied may be linear. FIGS. 13, 14 and 15 illustrate examples of linear machine embodiments of this invention. The general design principles described above for the rotary embodiments of this invention are applied in basically the same way in each of the linear embodiments so that different numbers of poles are used for the permanent magnet excitation on the one hand and for the reluctance distribution on the other hand.

FIG. 13 shows a single-sided linear machine. It has two relatively movable elongated, generally rectangular members 30 and 31 which are of laminated iron construction. The member 30 has its side that faces the member 31 formed with an odd number of similar rectangular cutouts 32 leaving an even number of similar, generally rectangular projections 34. Each of these projections 34 has a winding 35 wound on it so that it serves as a pole piece. It also has a row 36 of high strength rare earth permanent magnets. The row 36 of magnets may be a row of pairs of such magnets buried in the material that forms its edge that faces the member 31. The pairs of magnets of each row 36 would be buried in a manner similar to the pairs of magnets 16 that are buried in the pole pieces 14 of the generator described above and shown in FIG. 2, there being triangular pole piece portions between the magnets of each pair. The pairs of magnets of each row, would be of alternate polarity. Alternatively, the row 36 of magnets may be an appropriate number of high strength rare earth permanent magnets, equal in number to the number of pairs that would be provided and alternately polarised, which would be mounted on the surface of the pole piece that faces the member 31 in a similar manner to the arrangement described above with reference to and as shown in FIG. 4.

The member 31 has a row of uniformly spaced teeth 37 along its edge which faces the member 30. The number of magnetic poles afforded by the rows 36 of magnets is different from the number of permeance distribution points afforded by the teeth 37.

The members 30 and 31 are effectively linear versions of the stator 20 and the rotor 21 shown in FIG. 3 or in FIG. 4. The spacing of the projections 34 is substantially the same as that of the pole pieces 24 and the spacing of the teeth 37 is substantially the same as that of the teeth 23. Where the linear machine shown in FIG. 13 is used as a three phase linear motor, three phase current flow in the windup 35 continuously, produces an mmf wave which travels along the air gap between the members 30 & 31 from one end to the other. Productions of such an mmf wave is continuous because a fresh wave starts at one end before the preceeding wave reaches the other end of the air gap.

The machine shown in FIG. 14 is basically two of the machines described above with reference to and as shown in FIG. 13 mounted back to back, the central member 38 being a single member of laminated iron construction with rows of teeth along each edge and being effectively two of the members 31 back to back. This arrangement offers the possibility of mounting the two members 30 in common structure but spaced apart by the single member 38 so that the forces of attraction are cancelled out.

The machine shown in FIG. 15 is similar to that shown in FIG. 14 but with the polarities of the permanent magnets of the rows 36 and the coils 35 on one of the members 30 reversed. As a result, the magnetic paths pass straight through the member 38 so that it may be made much thinner which saves material and reduces weight.

We claim:

1. An alternating current generator which is arranged to provide multipolar permanent magnet excitation in combination with multipolar reluctance distribution wherein different numbers of poles are used for permanent magnet excitation and for reluctance distribution so that the principal working flux has a finite waveform number which is equal to the difference in wavenumber between the mmf and permeance distributions, the generator including two members of ferromagnetic material which form opposing boundaries of an air gap and at least one of which is movable relative to the other, one of the members having a plurality of salient pole pieces which each project towards the other member and form a respective part of the respective one of the opposing boundaries of the air gap, each salient pole piece carrying a respective winding wound thereon and a group of permanent magnets mounted on it between the winding and the other member so that there is a gap between that group of permanent magnets and the group of magnets mounted on each of the adjacent salient pole pieces, the magnets of each group being arranged side by side in a line which follows the respective boundary of the air gap and being arranged to form a certain number of magnetic poles which are alternately north and south poles, the groups of permanent magnets thereby providing the multipolar permanent magnet excitation, the other member comprising a body portion and a plurality of spaced projections which project from the body portion towards said one member in a direction which is transverse to the air gap, the number of projections which project from the body portion towards said one member and thereby provide the multipolar distribution being different from the magnetic waveform number that would be formed by a line of such alternately polarized magnets which were uniformly distributed along the whole of the respective boundary.

2. An alternating current generator according to claim 1, wherein the magnets are mounted on the surface of said one member that faces said other member.

3. An alternating current generator according to claim 3, wherein the ratio of thickness to width of each of the permanent magnets is substantially within the range 0.2 to 0.4.

4. An alternating current generator according to claim 3, wherein the ratio of thickness to width of each of the permanent magnets is substantially 0.2.

5. An alternating current generator according to claim 3, wherein the ratio of thickness to width of each of the permanent magnets is substantially 0.3.

6. An alternating current generator according to claim 2, wherein the lateral extent of each of the surface mounted magnets is greater than the width of the outer end of each projection of said other member.

7. An alternating current generator according to claim 1, wherein the magnets are buried within said one member adjacent the air gap.

8. An alternating current generator according to claim 1, wherein the area of the surface of each magnet that defines the respective one of the magnetic poles is greater than the area that magnet projects at the respective boundary of the air gap so that the flux density in the air gap associated with that magnet is greater than it would be if the surface of the magnet was flush with the respective boundary.

9. An alternating current generator according to claim 8, wherein the surface of at least one of the magnets that affords the respective one of the magnetic poles is flat and oblique to the respective boundary.

10. An alternating current generator according to claim 8, wherein the magnets are flat and parallel sided.

11. An alternating current generator according to claim 8, wherein the magnets are buried within said one member adjacent the air gap.

12. An alternating current generator according to claim 11, wherein the magnets are arranged in pairs, the magnets of each pair being of the same polarity, which is opposite to that of the juxtaposed pairs of magnets, and being arranged so that they converge radially inwardly, one on either side of a respective triangular pole piece, so that each triangular pole piece has the magnetic polarity of the convergent pair of magnets it is between.

13. An alternating current generator according to claim 12, wherein each triangular pole piece is joined to the remainder of said one member by a respective bridge portion which passes between the nearer, radially inner ends of the magnets of the respective pair.

14. An alternating current generator according to claim 12, wherein the spacing between the outer ends of each pair of buried convergent magnets plus the thickness of the two magnets of that buried pair is greater than the width of the outer end of each radial projection of said other member.

15. An alternating current generator according to claim 1, wherein the two members of ferromagnetic material comprise a cylindrical stator and a cylindrical rotor, the cylindrical rotor being mounted substantially coaxially with the cylindrical stator for rotation relative thereto and with the air gap therebetween, the air gap being annular, the salient pole pieces with the windings wound thereon and the permanent magnets being mounted on the stator, the permanent magnets being spaced circumferentially one from another around the air gap, the rotor comprising a cylindrical body portion and said projections projecting radially from the cylindrical body portion towards the stator.

16. An alternating current generator according to claim 15, wherein the rotor has a laminated construction.

17. An alternating current generator according to claim 15, wherein the stator is a hollow cylinder with the rotor mounted for rotation within it.

18. An alternating current generator according to claim 15, wherein the rotor is a hollow cylinder mounted for rotation around the stator.

19. An alternating current generator according to claim 1, wherein the two members are arranged so that the movement of a first of them relative to the second is linear.

20. An alternating current generator according to claim 19, wherein said one member is stationary.

21. An alternating current generator according to claim 19, wherein said one member is supported for linear movement relative to said other member.

22. An alternating current generator according to claim 19, wherein the two members are a first and a second of at least three such members, said second member being said other member and separating said first member from a third member of ferromagnetic material, said second and third members forming opposing boundaries of another air gap and at least one of said second and third members being linearly movable relative to the other of said second and third members, said third member having a plurality of respective salient pole pieces which each project towards said second member and form a respective part of the respective one of the boundaries of the other air gap, each of the respective salient pole pieces carrying a respective winding wound thereon and a group of permanent magnets mounted on it between the respective winding and said second member so that there is a gap between that group of magnets and the group of magnets mounted on each of the adjacent respective pole pieces, the magnets of each group being arranged side by side in at least one line which follows the boundary of the other air gap and being arranged to form a certain number of magnetic poles which are alternately north and south poles, there being a further plurality of spaced projections which project from the body portion of said second member towards said third member in a direction which is transverse to said other air gap, the number of these further projections being different from the magnetic waveform number that would be formed by a line of such alternately polarised magnets which are mounted on said third member and uniformly distributed along the whole of the boundary of said other air gap.

23. An alternating current generator according to claim 22, wherein said first and third members are mirror images of one another as are the rows of projections formed on either side of said second member.

24. An alternating current generator according to claim 22, wherein the second member is supported for linear movement relative to said first and third members.

25. An alternating current generator according to claim 22, wherein the polarities of the windings and of the magnets on said third member are the reverse of those on said first member so that the resultant paths of magnetic flux pass across said second member between said first and said third members.

26. An alternating current generator according to claim 1, wherein each of the number of projections tapers from the body towards the stator.

27. An alternating current generator according to claim 1, wherein the number of projections which project from the body portion is half said certain number of magnetic poles plus or minus half the number of poles of the windings.

28. An alternating current motor which is arranged to provide multipolar permanent magnet excitation in combination with multipolar reluctance distribution wherein the motor has at least three phases with working windings for each phase and different numbers of poles are used for permanent magnet excitation and for reluctance distribution so that the principal working flux has a finite waveform number which is equal to the difference in wavenumber between the mmf and permeance distributions, the motor including two members of ferromagnetic material which form opposing boundaries of an air gap and at least one of which is movable relative to the other, one of the members having a plurality of salient pole pieces which each project towards the other member and form a respective part of the respective one of the opposing boundaries of the air gap, each salient pole piece carrying a respective winding of the three phase working windings wound thereon and a group of permanent magnets mounted on it between the respective winding and the other member so that there is a gap between that group of permanent magnets and the group of magnets mounted on each of the adjacent salient pole pieces, the magnets of each group being arranged side by side in a line which follows the respective boundary of the air gap and being arranged to form a certain number of magnetic poles which are alternately north and south poles, the groups of permanent magnets thereby providing the multipolar permanent magnet excitation, the other member comprising a body portion and a plurality of spaced projections which project from the body portion towards said one member in a direction which is transverse to the air gap, the number of projections which project from the body portion towards said one member and thereby provide the multipolar reluctance distribution being different from the magnetic waveform number that would be formed by a line of such alternately polarised magnets which were uniformly distributed along the whole of the respective boundary.

29. An alternating current motor according to claim 28, wherein the magnets are mounted on the surface of said one member that faces said other member.

30. An alternating current motor according to claim 29, wherein the ratio of thickness to width of each of the permanent magnets is substantially within the range 0.2 to 0.4.

31. An alternating current motor according to claim 30, wherein the ratio of thickness to width of each of the permanent magnets is substantially 0.2.

32. An alternating current motor according to claim 30, wherein the ratio of thickness to width of each of the permanent magnets is substantially 0.3.

33. An alternating current motor according to claim 28, wherein the magnets are buried within said one member adjacent the air gap.

34. An alternating current motor according to claim 28, wherein the area of the surface of each magnet that affords the respective one of the magnetic poles is greater than the area that magnet projects at the respective boundary of the air gap so that the flux density in the air gap associated with that magnet is greater than it would be if the surface of the magnet was flush with the respective boundary.

35. An alternating current motor according to claim 34, wherein the surface of at least one of the magnets that affords the respective one of the magnetic poles is flat and oblique to the respective boundary.

36. An alternating current motor according to claim 34, wherein the magnets are flat and parallel sided.

37. An alternating current motor according to claim 34, wherein the magnets are buried within said one member adjacent the air gap.

38. An alternating current motor according to claim 37, wherein the magnets are arranged in pairs, the magnets of each pair being of the same polarity, which is opposite to that of the juxtaposed pairs of magnets, and being arranged so that they converge radially inwardly, one on either side of a respective triangular pole piece, so that each triangular pole piece has the magnetic polarity of the convergent pair of magnets it is between.

39. An alternating current motor according to claim 38, wherein each triangular pole piece is joined to the remainder of said one member by a respective bridge portion which passes between the nearer, radially inner ends of the magnets of the respective pair.

40. An alternating current motor according to claim 38, wherein the spacing between the outer ends of each pair of buried convergent magnets plus the thickness of the two magnets of that buried pair is greater than the width of the outer end of each radial projection of said other member.

41. An alternating current motor according to claim 28, wherein the number of projections which project from the body portion is half said certain number of magnetic poles plus or minus half the number of poles of the windings.

42. An alternating current motor according to claim 28, wherein the lateral extent of each of the surface mounted magnets is greater than the width of the outer end of each projection of said other member.

43. An alternating current motor according to claim 28, wherein the two members of ferromagnetic material comprise a cylindrical stator and a cylindrical rotor, the cylindrical rotor being mounted substantially coaxially with the cylindrical stator for rotation relative thereto and with the air gap therebetween, the air gap being annular, the salient pole pieces with the windings woumd thereon and the permanent magnets being mounted on the stator, the permanent magnets being spaced circumferentially one from another around the air gap, the rotor comprising a cylindrical body portion and said projections projecting radially from the cylindrical body portion towards the stator.

44. An alternating current motor according to claim 43, wherein the rotor has a laminated construction.

45. An alternating current motor according to claim 43, wherein the stator is a hollow cylinder with the rotor mounted for rotation within it.

46. An alternating current motor according to claim 43, wherein the rotor is a hollow cylinder mounted for rotation around the stator.

47. An alternating current motor according to claim 28, wherein the two members are arranged so that the movement of a first of them relative to the second is linear.

48. An alternating current motor according to claim 47, wherein said one member is stationary.

49. An alternating current motor according to claim 47, wherein said one member is supported for linear movement relative to said other member.

50. An alternating current motor according to claim 47, wherein the two members are a first and a second of at least three such members, said second member being said other member and separating said first member from a third member of ferromagnetic material, said second and third members forming opposing boundaries of another air gap and at least one of said second and third members being linearly movable relative to the other of said second and third members, said third member having a plurality of respective salient pole pieces which each project towards said second member and form a respective part of the respective one of the boundaries of the other air gap, each of the respective salient pole pieces carrying a respective winding wound thereon and a group of permanent magnets mounted on it between the respective winding and said second member so that there is a gap between that group of magnets mounted on each of the adjacent respective pole pieces, the magnets of each group being arranged side by side in at least one line which follows the boundary of the other air gap and being arranged to form a certain number of magnetic poles which are alternately north and south poles, there being a further plurality of spaced projections which project from the body portion of said second member towards said third member in a direction which is transverse to said other air gap, the number of these further projections being different from the magnetic waveform number that would be formed by a line of such alternately polarised magnets which are mounted on said third member and uniformly distributed along the whole of the boundary of said other air gap.

51. An alternating current motor according to claim 50, wherein said first and third members are mirror images of one another as are the rows of projections formed on either side of said second member.

52. An alternating current motor according to claim 50, wherein the polarities of the windings and of the magnets on said third member are the reverse of those on said first member so that the resultant paths of magnetic flux pass across said second member between said first and said third members.

53. An alternating current motor according to claim 47, wherein the second member is supported for linear movement relative to said first and third members.

54. An alternating current motor according to claim 28, wherein each of the number of projections tapers from the body towards the stator.

55. An alternating current machine which is arranged to provide mulitpolar permanent magnet excitation in combination with multipolar reluctance distribution wherein different numbers of poles are used for permanent magnet excitation and for reluctance distribution so that the principal working flux has a finite waveform number which is equal to the difference in wavenumber between the mmf and permeance distributions, the machine including a cylindrical stator and a hollow cylindrical rotor which is mounted substantially coaxially with the cylindrical stator for rotation around the cylindrical stator with an annular air gap therebetween, the stator and the rotor being formed of ferromagnetic material, the stator having a plurality of salient pole pieces which each project towards the rotor and form a respective part of the respective one of the opposing boundaries of the air gap, each salient pole piece carrying a respective winding wound thereon and a group of permanent magnets mounted on it between the winding and the rotor so that there is a gap between that group of permanent magnets and the group of magnets mounted on each of the adjacent pole pieces, the magnets of each group being arranged side by side in at least one circular line which follows the respective boundary for the air gap and being arranged to form a certain number of magnetic poles which are alternately north and south poles, the groups of permanent magnets thereby providing the multipolar permanent excitation, the rotor being formed as a cylindrical body with a plurality of spaced projections which project radially from the body towards the stator and thereby provide the multipolar distribution, the number of projections being different from the magnetic waveform number that would be formed by a circular line of such alternately polarised magnets uniformly distributed along the whole of the respective boundary.

56. An alternating current machine according to claim 55, wherein the magnets are mounted on the surface of the stator that faces the rotor.

57. An alternating current machine according to claim 56, wherein the ratio of thickness to width of each of the permanent magnets is substantially within the range 0.2 to 0.4.

58. An alternating current machine according to claim 57, wherein the ratio of thickness to width of each of the permanent magnets is substantially 0.2.

59. An alternating current machine according to claim 57, wherein the ratio of thickness to width of each of the permanent magnets is substantially 0.3.

60. An alternating current machine according to claim 56, wherein the magnets are buried within the stator adjacent the air gap.

61. An alternating current machine according to claim 56, wherein the lateral extent of each of the surface mounted magnets is greater than the width of the outer end of each projection of said other member.

62. An alternating current machine according to claim 55, wherein the area of the surface of each magnet that affords the respective one of the magnetic poles is greater than the area that magnet projects at the respective boundary of the air gap so that the flux density in the air gap associated with that magnet is greater than it would be if the surface of the magnet was flush with the respective boundary.

63. An alternating current machine according to claim 62, wherein the surface of at least one of the magnets that affords the respective one of the magnetic poles is flat and oblique to the respective boundary.

64. An alternating current machine according to claim 62, wherein the magnets are flat and parallel sided.

65. An alternating current machine according to claim 62, wherein the magnets are buried within said one member adjacent the air gap.

66. An alternating current machine according to claim 55, wherein the number of projections which project from the body portion is half said certain number of magnetic poles plus or minus half the number of poles of the windings.

67. An alternating current machine according to claim 55, wherein the magnets are arranged in pairs, the magnets of each pair being of the same polarity, which is opposite to that of the juxtaposed pairs of magnets, and being arranged so that they converge radially inwardly, one on either side of a respective triangular pole piece, so that each triangular pole piece has the magnetic polarity of the convergent pair of magnets it is between.

68. An alternating current machine according to claim 67, wherein each triangular pole piece is joined to the remainder of the stator by a respective bridge portion which passes between the nearer, radially inner ends of the magnets of the respective pair.

69. An alternating current machine according to claim 67, wherein the spacing between the outer ends of each pair of buried convergent magnets plus the thickness of the two magnets of that buried pair is greater than the width of the outer end of each radial projection of said other member.

70. An alternating current machine according to claim 55, wherein the two members of ferromagnetic material comprise a cylindrical stator and a cylindrical rotor, the cylindrical rotor being mounted substantially coaxially with the cylindrical stator for rotation relative thereto and with the air gap therebetween, the air gap being annular, the winding arrangement and the permanent magnets being mounted on the stator, the permanent magnets being spaced circumferentially one from another around the air gap, the rotor comprising a cylindrical body portion and said projections projecting radially from the cylindrical body portion towards the stator.

71. An alternating current machine according to claim 70, wherein the rotor has a laminated construction.

72. An alternating current machine according to claim 55, wherein each of the number of projections tapers from the body towards the stator.

73. An alternating current machine which is arranged to provide multipolar permanent magnet excitation in combination with multipolar reluctance distribution wherein different numbers of poles are used for permanent magnet excitation and for reluctance distribution so that the principal working flux has a finite waveform number which is equal to the difference in wavenumber between the mmf and permeance distributions, the machine including two members of ferromagnetic material which form opposing boundaries of an air gap and at least one of which is movable linearly relative to the other, one of the members having a plurality of salient pole pieces which each project towards the other member and form a respective part of one of the opposing boundaries of the air gap, each salient pole piece carrying a respective winding thereon and a group of permanent magnets mounted on it between the winding and the other member so that there is a gap between that group of permanent magnets and the group of magnets mounted on each of a group the adjacent salient pole pieces, the magnets of each group being arranged side by side in at least one line which follows the respective boundary of the air gap and being arranged to form a certain number of magnetic poles which are alternately north and south poles, the groups of permanent magnets thereby providing the multipolar permanent magnet excitation, the other member comprising a body portion and a plurality of spaced projections which project from the body portion towards said one member in a direction which is transverse to the air gap and thereby provide the multipolar reluctance distribution, the number of projections being different from the magnetic waveform number that would be formed by a line of such alternately polarised magnets uniformly distributed along the whole of the respective boundary.

74. An alternating current machine according to claim 73, wherein the magnets are mounted on the surface of said one member that faces said other member.

75. An alternating current machine according to claim 74, wherein the ratio of thickness to width of each of the permanent magnets is substantially within the range 0.2 to 0.4.

76. An alternating current machine according to claim 75, wherein the ratio of thickness to width of each of the permanent magnets is substantially 0.2.

77. An alternating current generator according to claim 75, wherein the ratio of thickness to width of each of the permanent magnets is substantially 0.3.

78. An alternating current machine according to claim 74, wherein the magnets are buried within said one member adjacent the air gap.

79. An alternating current machine according claim 78, wherein the magnets are arranged in pairs, the magnets of each pair being of the same polarity, which is opposite to that of the juxtaposed pairs of magnets, and being arranged so that they converge radially inwardly, one on either side of a respective triangular pole piece, so that each triangular pole piece has the magnetic polarity of the convergent pair of magnets it is between.

80. An alternating current machine according to claim 79, wherein each triangular pole piece is joined to the remainder of said one member by a respective bridge portion which passes between the nearer, radially inner ends of the magnets of the respective pair.

81. An alternating current machine according to claim 79, wherein the spacing between the outer ends of each pair of buried convergent magnets plus the thickness of the two magnets of that buried pair is greater than the width of the outer end of each radial projection of said other member.

82. An alternating current machine according to claim 73, wherein the area of the surface of each magnet that affords the respective one of the magnetic poles is greater than the area that magnet projects at the respective boundary of the air gap so that the flux density in the air gap associated with that magnet is greater than it would be if the surface of the magnet was flush with the respective boundary.

83. An alternating current machine according to claim 82, wherein the surface of at least one of the magnets that affords the respective one of the magnetic poles is flat and oblique to the respective boundary.

84. An alternating current machine according to claim 82, wherein the magnets are flat and parallel sided.

85. An alternating current machine according to claim 82, wherein the magnets are buried within said one member adjacent the air gap.

86. An alternating current machine according claim 73, wherein the number of projections which project from the body portion is half said certain number of magnetic poles plus or minus half the number of poles of the windings.

87. An alternating current machine according to claim 73, wherein the lateral extent of each of the surface mounted magnets is greater than the width of the outer end of each projection of said other member.

88. An alternating current machine according to claim 73, wherein said one member has a laminated construction.

89. An alternating current machine according to claim 73, wherein said one member is stationary.

90. An alternating current machine according to claim 73, wherein said one member is supported for linear movement relative to said other member.

91. An alternating current machine according to claim 73, wherein the two members are a first and a second of at least three such members, said second member being said other member and separating said first member from a third member of ferromagnetic material, said second and third members forming opposing boundaries of another air gap and at least one of said second and third members being linearly movable relative to the other of said second and third members, said third member having a plurality of respective salient pole pieces which each project towards said second member and form a respective part of the respective one of the boundaries of the other air gap, each of the respective salient pole pieces carrying a respective winding wound thereon and a group of permanent magnets mounted on it between the respective winding and said second member so that there is a gap between that group of magnets and the group of magnets mounted on each of the adjacent respective salient pole pieces, the magnets of each group being arranged side by side in at least one line which follows the boundary of the other air gap and being arranged to form a certain number of magnetic poles which are alternately north and south poles, there being a further plurality of spaced projections which project from the body portion of said second member towards said third member in a direction which is transverse to said other air gap, the number of these further projections being different from the magnetic waveform number that would be formed by a line of such alternately polarised magnets which are mounted on said third member and uniformly distributed along the whole of the boundary of said other air gap.

92. An alternating current machine according to claim 91, wherein said first and third members are mirror images of one another as are the rows of projections formed on either side of said second member.

93. An alternating current machine according to claim 91, wherein the second member is supported for linear movement relative to said first and third members.

94. An alternating current machine according to claim 91, wherein the polarities of the windings and of the magnets on said third member are the reverse of those on said first member so that the resultant paths of magnetic flux pass across said second member between said first and said third members.

95. An alternating current machine according to claim 73, wherein each of the number of projections tapers from the body towards said one member.

96. An alternating current machine which is arranged to provide multipolar permanent magnet excitation in combination with multipolar reluctance distribution and in which different numbers of poles are used for permanent magnet excitation and for reluctance distribution so that the principal working flux has a finite waveform number which is equal to the difference in wavenumber between the mmf and permeance distributions, the machine including two members of ferromagnetic material which form opposing boundaries of an air gap and at least one of which is movable relative to the other, one of the members having a plurality of salient pole pieces which each project towards the other member and form a respective part of the respective one of the opposing boundaries of the air gap, each salient pole piece carrying a respective winding wound thereon and a group of permanent magnets mounted on it between the winding and the other member so that there is a gap between that group of permanent magnets and the group of magnets mounted on each of the adjacent salient pole pieces, the magnets of each group being arranged side by side in at least one line which follows the respective boundary of the air gap and being arranged to form a certain number of magnetic poles which are alternately north and south poles, the groups of permanent magnets thereby providing the multipolar permanent magnet excitation, the other member comprising a body portion and a plurality of spaced projections which project from the body portion towards said one member in a direction which is transverse to the air gap and thereby provide the multipolar reluctance distribution, the number of projections being different from the magnetic waveform number that would be formed by a line of such alternately polarised magnets uniformly distributed along the whole of the respective boundary, wherein the area of the surface of each magnet that defines the respective one of the magnetic poles is greater than the area that magnet projects at the respective boundary of the air gap so that the flux density in the air gap associated with that magnet is greater than it would be if the surface of the magnet was flush with the respective boundary.

97. An alternating current machine according to claim 96, wherein the surface of at least one of the magnets that affords the respective one of the magnetic poles is flat and oblique to the respective boundary.

98. An alternating current machine according to claim 97, wherein the two members are a first and a second of at least three such members, said second member being said other member and separating said first member from a third member of ferromagnetic material, said second and third members forming opposing boundaries of another air gap and at least one of said second and third members being linearly movable relative to the other of said second and third members, said third member having a respective plurality of salient pole pieces which each project towards said second member and form a respective one of the other air gap, each of the respective salient pole pieces carrying a respective winding wound thereon and a group of permanent magnets mounted on it between the respective winding and said second member so that there is a gap between that group of magnets and the group of magnets mounted on each adjacent respective salient pole piece, the magnets of each group being arranged side by side in at least one line which follows the boundary of the other air gap and being arranged to form a certain number of magnetic poles which are alternately north and south poles, there being a further plurality of spaced projections which project from the body portion of said second member towards said third member in a direction which is transverse to said other air gap, the number of these further projections being different from the magnetic waveform number that would be formed by a line of such alternately polarised magnets which are mounted on said third member and uniformly distributed along the whole of the boundary of said other air gap.

99. An alternating current machine according to claim 98, wherein said first and third members are mirror images of one another as are the rows of projections formed on either side of said second member.

100. An alternating current machine according to claim 98, wherein the second member is supported for linear movement relative to said first and third members.

101. An alternating current machine according to claim 98, wherein the polarities of the windings and of the magnets on said third member are the reverse of those on said first member so that the resultant paths of magnetic flux pass across said second member between said first and said third members.

102. An alternating current machine according to claim 96, wherein the magnets are flat and parallel sided.

103. An alternating current machine according to claim 96, wherein the magnets are buried within said one member adjacent the air gap.

104. An alternating current machine according to claim 96, wherein the number of projections which project from the body portion is half said certain number of magnetic poles plus or minus half the number of poles of the windings.

105. An alternating current machine according to claim 96, wherein the magnets are arranged in pairs, the magnets of each pair being of the same polarity, which is opposite to that of the juxtaposed pairs of magnets, and being arranged so that they converge radially inwardly, one on either side of a respective triangular pole piece, so that each triangular pole piece has the magnetic polarity of the convergent pair of magnets it is between.

106. An alternating current machine according to claim 105, wherein each triangular pole piece is joined to the remainder of said one member by a respective bridge portion which passes between the nearer, radially inner ends of the magnets of the respective pair.

107. An alternating current machine according to claim 105, wherein the spacing between the outer ends of each pair of buried convergent magnets plus the thickness of the two magnets of that buried pair is greater than the width of the outer end of each radial projection of said other member.

108. An alternating current machine according to claim 96, wherein the two members of ferromagnetic material comprise a cylindrical stator and a cylindrical rotor, the cylindrical rotor being mounted substantially coaxially with the cylindrical stator for rotation relative thereto and with the air gap therebetween, the air gap being annular, the salient pole pieces with the windings wound thereon and the permanent magnets being mounted on the stator, the permanent magnets being spaced circumferentially one from another around the air gap, the rotor comprising a cylindrical body portion and said projections projecting radially from the cylindrical body portion towards the stator.

109. An alternating current machine according to claim 108, wherein the rotor has a laminated construction.

110. An alternating current machine according to claim 108, wherein the stator is a hollow cylinder with the rotor mounted for rotation within it.

111. An alternating current machine according to claim 108, wherein the rotor is a hollow cylinder mounted for rotation around the stator.

112. An alternating current machine according to claim 96, wherein the two members are arranged so that the movement of a first of them relative to the second is linear.

113. An alternating current machine according to claim 112, wherein said one member is stationary.

114. An alternating current machine according to claim 112, wherein said one member is supported for linear movement relative to said other member.

115. An alternating current machine according to claim 96, wherein each of the number of projections tapers from the body towards the stator.

116. An alternating current machine which is arranged to provide multipolar permanent magnet excitation in combination with multipolar reluctance distribution wherein different numbers of poles are used the permanent magnet excitation and for reluctance distribution so that the principal working flux has a finite waveform number which is equal to the difference in wavenumber between the mmf and permeance distributions, the alternating current machine including two members of ferromagnetic material which form opposing boundaries of an air gap and at least one of which is movable relative to the other, one of the members having a plurality of salient pole pieces which each project towards the other member and form a respective part of the respective one of the opposing boundaries of the air gap, each salient pole piece carrying a respective winding wound thereon and a group of permanent magnets mounted on it between the winding and the other member so that there is a gap between that group of permanent magnets and the group of permanent magnets mounted on each of the adjacent salient pole pieces, the magnets of each group being arranged side by side in at least one line which follows the respective boundary of the air gap and being arranged to form a certain number of magnetic poles which are alternately north and south poles, the groups of permanent magnets thereby providing the multipolar permanent magnet excitation, the other member comprising a body portion and a plurality of spaced projections which project from the body portion towards said one member in a direction which is transverse to the air gap and thereby provide the multipolar reluctance distribution, the number of projections being different from the magnetic waveform number that would be formed by a line of such alternately polarised magnets uniformly distributed along the whole of the respective boundary, wherein the ratio of thickness to width of each of the permanent magnets is substantially within the range of 0.2 to 0.4.

117. An alternating current machine according to claim 116, wherein the ratio of thickness to width of each of the permanent magnets is substantially 0.2.

118. An alternating current machine according to claim 117, wherein the ratio of thickness to width of each of the permanent magnets is substantially 0.3.

119. An alternating current machine according to claim 116, wherein the number of projections which project from the body portion is half said certain number of magnetic poles plus or minus half the number of poles of the windings.

120. An alternating current machine according claim 116, wherein the lateral extent of each of the surface mounted magnets is greater than the width of the outer end of each projection of said other member.

121. An alternating current machine according to claim 116, wherein the two members of ferromagnetic material comprise a cylindrical stator and a cylindrical rotor, the cylindrical rotor being mounted substantially coaxially with the cylindrical stator for rotation relative thereto and with the air gap therebetween, the air gap being annular, the salient pole pieces with the windings wound thereon and the permanent magnets being mounted on the stator, the permanent magnets being spaced circumferentially one from another around the air gap, the rotor comprising a cylindrical body portion and said projections projecting radially from the cylindrical body portion towards the stator.

122. An alternating current machine according to claim 121, wherein the rotor has a laminated construction.

123. An alternating current machine according to claim 121, wherein the stator is a hollow cylinder with the rotor mounted for rotation within it.

124. An alternating current machine according to claim 121, wherein the rotor is a hollow cylinder mounted for rotation around the stator.

125. An alternating current machine according to claim 116, wherein the two members are arranged so that the movement of a first of them relative to the second is linear.

126. An alternating current machine according to claim 125, wherein said one member is stationary.

127. An alternating current machine according to claim 125, wherein said one member is supported for linear movement relative to said other member.

128. An alternating current machine according to claim 125, wherein the two members are a first and a second of at least three such members, said second member being said other member and separating said first member from a third member of ferromagnetic material, said second and third members forming opposing boundaries of another air gap and at least one of said second and third members being linearly movable relative to the other of said second and third members, said third member having a plurality of respective salient pole pieces which each project towards said second member and form a respective part of the respective one of the boundaries of the other air gap, each of the respective salient pole pieces carrying a respective winding wound thereon and a group of permanent magnets mounted on it between the respective winding and said second member so that there is a gap between that group of magnets and the group of magnets mounted on each of the adjacent respective salient pole pieces, the magnets of each group being arranged side by side in at least one line which follows the boundary of the other air gap and being arranged to form a certain number of magnetic poles which are alternately north and south poles, there being a further plurality of spaced projections which project from the body portion of said second member towards said third member in a direction which is transverse to said other air gap, the number of these further projections being different from the magnetic waveform number that would be formed by a line of such alternately polarised magnets which are mounted on said third member and uniformly distributed along the whole of the boundary of said other air gap.

129. An alternating current machine according to claim 128, wherein said first and third members are mirror images of one another as are the rows of projections formed on either side of said second member.

130. An alternating current machine according to claim 128, wherein the polarities of the windings and of the magnets on said third member are the reverse of those on said first member so that the resultant paths of magnetic flux pass across said second member between said first and said third members.

131. An alternating current machine according to claim 125, wherein the second member is supported for linear movement relative to said first and third members.

132. An alternating current machine according to claim 116, wherein each of the number of projections tapers from the body towards the stator.

* * * * *